(12) United States Patent
Davis et al.

(10) Patent No.: US 9,940,284 B1
(45) Date of Patent: Apr. 10, 2018

(54) STREAMING INTERCONNECT ARCHITECTURE

(71) Applicant: Amazon Technologies, Inc., Seattle, WA (US)

(72) Inventors: Mark Bradley Davis, Austin, TX (US); Asif Khan, Cedar Park, TX (US); Thomas A. Volpe, Austin, TX (US); Robert Michael Johnson, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 443 days.

(21) Appl. No.: 14/673,474

(22) Filed: Mar. 30, 2015

(51) Int. Cl.
  *G06F 13/40* (2006.01)
  *G06F 13/42* (2006.01)

(52) U.S. Cl.
  CPC ...... *G06F 13/4027* (2013.01); *G06F 13/4221* (2013.01)

(58) Field of Classification Search
  None
  See application file for complete search history.

(56) References Cited

U.S. PATENT DOCUMENTS

| | | | |
|---|---|---|---|
| 6,298,370 B1 | 10/2001 | Tang et al. | |
| 6,925,641 B1 | 8/2005 | Elabd et al. | |
| 7,835,380 B1 | 11/2010 | Aloni et al. | |
| 7,992,144 B1* | 8/2011 | Hendel | G06F 9/5077 709/250 |
| 8,427,347 B1 | 4/2013 | Chai et al. | |
| 8,850,288 B1 | 9/2014 | Lazier et al. | |
| 2003/0090702 A1 | 5/2003 | Trelewicz et al. | |
| 2008/0320476 A1 | 12/2008 | Wingard et al. | |
| 2009/0055826 A1 | 2/2009 | Bernstein et al. | |
| 2009/0150748 A1 | 6/2009 | Egner et al. | |
| 2009/0245097 A1* | 10/2009 | Takakuwa | H04L 45/245 370/217 |
| 2012/0297039 A1 | 11/2012 | Acuna et al. | |
| 2013/0198571 A1 | 8/2013 | Brewerton et al. | |
| 2013/0262958 A1 | 10/2013 | Ruggiero et al. | |
| 2014/0115423 A1 | 4/2014 | Cooke | |
| 2015/0039577 A1 | 2/2015 | Talagala et al. | |
| 2015/0178161 A1 | 6/2015 | Burd et al. | |

(Continued)

OTHER PUBLICATIONS

U.S. Appl. No. 15/189,231, filed Jun. 22, 2016, Titled: Servicing I/O Requests in an I/O Adapter Device.

(Continued)

*Primary Examiner* — Farley Abad
*Assistant Examiner* — Dayton Lewis-Taylor
(74) *Attorney, Agent, or Firm* — Kilpatrick Townsend & Stockton LLP

(57) ABSTRACT

A device can include one of more configurable packet processing pipelines to process a plurality of packets. Each configurable packet processing pipeline can include a plurality of packet processing components, wherein each packet processing component is configured to perform one or more packet processing operations for the device. The plurality of packet processing components are coupled to a packet processing interconnect, wherein each packet processing component is configured to route the packets through the packet processing interconnect for the one or more configurable packet processing pipelines.

17 Claims, 16 Drawing Sheets

(56) References Cited

U.S. PATENT DOCUMENTS

2015/0212844 A1   7/2015  Tsirkin et al.
2015/0349805 A1  12/2015  Tsai et al.

OTHER PUBLICATIONS

U.S. Appl. No. 14/620,764, filed Feb. 12, 2015, Titled: Servicing I/O Requests in an I/O Adapter Device.
U.S. Appl. No. 14/671,800, filed Mar. 27, 2015, Titled: Payload Checksum Interval.
U.S. Appl. No. 14/672,658, filed Mar. 30, 2015, Titled: Low Latency Write Requests.
U.S. Appl. No. 14/750,926, filed Jun. 25, 2015, Titled: Data Size Reduction.
Kornaros et al., "Pipelined multi-queue management in a vlsi atm switch chip with credit-based flow-control", *Proceedings of the Seventeenth Conference on Advanced Research in VLSI*, 1997, pp. 127-144.
Ridenour et al., "Low-power buffer management for streaming data", *Circuits and Systems for Video Technology*, IEEE Transactions, 2007, pp. 143-157.
Tzeng et al., "Task management for irregular-parallel workloads on the GPU", *Proceedings of the Conference on High Performance Graphics*, Eurographics Association, 2010, pp. 29-37.

\* cited by examiner

DESTINATION TABLE

| Path Field | Destination Routing Option |
|---|---|
| 1 | Fixed Destination |
| 2 | Destination selected from multiple destinations based on Round Robin Algorithm |
| 3 | Destination selected from multiple destinations based on Load Balance |
| 4 | Destination selected from multiple destinations based on Hash |

FIG. 6E

STREAMING INTERCONNECT ARCHITECTURE

BACKGROUND

Computer networks may typically include a plurality of servers that can host data and provide services to multiple clients or organizations. The clients or organizations can use these services or data to power a wide variety of workloads such as storage, data processing and warehousing, web and mobile applications, archive and many other tasks. Generally, clients request services or data from a host system and the host system responds by executing certain tasks to service the request and/or provide the data over the network.

The data may often be transferred as packets. In some instances, a pipeline may be implemented to process the packets. However, in conventional packet processing systems, the pipeline to process the packets may not be flexible or scalable. For example, if a pipeline is implemented in hardware (e.g., as an integrated circuit), the pipeline may not be altered easily once the hardware is fabricated. In addition, while the packets are flowing through the pipeline, any access to shared memories may slow down the performance of the system as well as bandwidth of the memories available for other tasks. This may result in reduced throughput of the system.

BRIEF DESCRIPTION OF THE DRAWINGS

Various embodiments in accordance with the present disclosure will be described with reference to the drawings, in which:

FIG. 6E illustrates an exemplary destination table for a streaming component, according to some embodiments of the technology.

DETAILED DESCRIPTION

Figure 1:
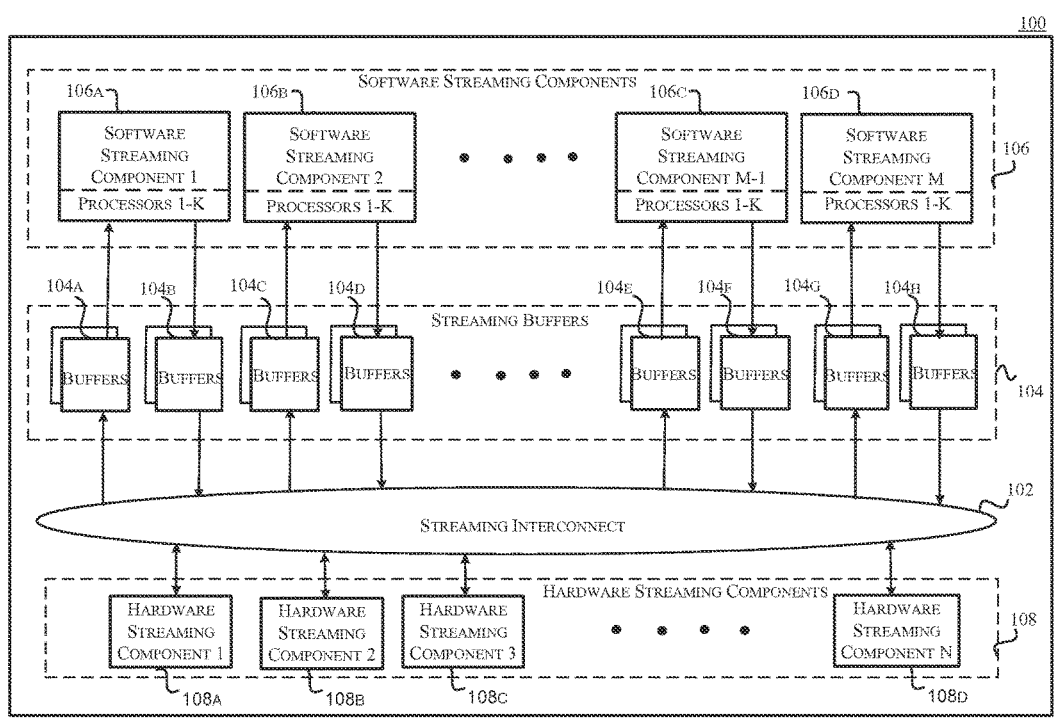
FIG. 1 illustrates a streaming infrastructure for processing packets according to various embodiments of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generally speaking, in conventional systems, pipelines for processing packets through a network interface coupled to a host machine may lack flexibility and scalability. For example, if a pipeline is implemented using hardware components, the pipeline may not be altered easily once the hardware is fabricated. In addition, while the packets are flowing through a pipeline, any access to shared memories may slow down the performance of the system as well as bandwidth of the memories available for other tasks. This may result in reduced throughput of the system.

Various embodiments of the disclosed technologies provide a flexible streaming infrastructure that can allow dynamic stitching of a plurality of streaming components in an input/output (I/O) device to form one or more processing pipelines for processing packets by the I/O device. For example, the I/O device may be configured to provide network and compute services for a host device. The plurality of streaming components may include various software and/or hardware streaming components. Each streaming component may be configured to perform one or more packet processing operations. For example, the one or more packet processing operations may include compression, de-compression, encryption, decryption, etc. According to various embodiments of the disclosed technologies, multiple packet processing pipelines can coexist simultaneously within the streaming infrastructure and the components may be shared among multiple packet processing pipelines. Packets can be steered through the appropriate streaming components based on the processing needs of each packet. In some embodiments, "streaming" may refer to packet processing. For example, a streaming component may refer to a packet processing component that can perform one or more packet processing operations on a packet. In this specification, the terms "streaming" and "packet processing" may be used interchangeably in certain contexts, for example, streaming component and packet processing component may be used interchangeably, streaming interconnect and packet processing interconnect may be used interchangeably, streaming buffer and packet processing buffer may be used interchangeably. In some instances, a streaming packet may refer to a sequence of packets. In certain implementations, a streaming packet may have additional information, besides packet header and packet payload, such as packet information header to facilitate the routing and processing of the packet through the offload pipeline.

In some embodiments, a streaming interconnect may be coupled to each of the hardware and software streaming components that can provide connectivity among all the streaming components. The streaming interconnect may be configured to allow for simultaneous connections between multiple pairs of streaming components in different packet processing pipelines. A packet information header can be attached to each packet that can be used by the streaming components to route the packets through the streaming interconnect. The software streaming components may include one or more processors that may be configured to execute instructions for performing packet processing operations. One or more streaming buffers can be coupled to each of the one or more processors that can provide an interface between the processors and the streaming interconnect to present the processors as software streaming components to the streaming interconnect.

Multiple pipelines can be defined based on the type of streaming packets flowing through the streaming interconnect. Various embodiments of the disclosed technologies can allow processing of the streaming packets by directly passing only packet information headers (e.g., without the entire packet including the packet payload) between various streaming components without using any memory bandwidth and without having any central buffering choke point. Further, some embodiments of the disclosed technologies can allow software extensible pipelines that can enable the software to augment hardware packet processing.

FIG. 1 illustrates a streaming or packet processing infrastructure for processing packets according to various embodiments of the disclosed technologies. A device can include a plurality of streaming or packet processing components that may be coupled to a streaming or packet processing interconnect. The plurality of streaming components may include a plurality of hardware streaming or packet processing components and a plurality of software streaming or packet processing components. Each software streaming component can comprise one or more processors that may be coupled to a plurality of streaming or packet processing buffers. The streaming interconnect may be coupled to the plurality of streaming buffers and to the plurality of hardware streaming components. The device can include multiple packet processing pipelines that can coexist simultaneously through the streaming interconnect.

Device 100 may be an Input/Output (I/O) adapter device that may be configured to process incoming packets and provide an output data stream that may or may not be in the same format. In some instances, multiple streaming packets may be flowing through the streaming infrastructure supported by the device 100. For example, the device 100 may be a plug-in module, an expansion card or any such electronic circuit, e.g., network interface controller, video card, sound card, USB (Universal Serial Bus) device, Wi-Fi device, etc. In some embodiments, the device 100 may be configured to communicate with a host device to process I/O requests for the host device. For example, in some instances, the device 100 may be configured to process packets to perform network and compute services for the host device. In some cases, at least a portion of the device 100 can be implemented as part of a System on Chip (SoC). An exemplary system including an I/O adapter device in communication with a host device will be described in greater detail with reference to FIG. 12.

The device 100 may include software streaming components 106, streaming buffers 104 and hardware streaming components 108. A streaming interconnect 102 may be coupled to the streaming buffers 104 and to the hardware streaming components 108. The device 100 may include one or more configurable packet processing pipelines for processing the packets. Each packet received by the device 100 may include a packet header and a payload. A metadata header called a packet information header may be attached to each incoming packet. In some embodiments, the packet received by the device 100 may produce two streaming packets that may be processed by separate pipelines through the streaming interconnect 102. The packet information header can be used by the streaming components for routing the streaming packets through the streaming interconnect 102. A streaming packet may represent a unit of data in a data stream. In some embodiments, a first streaming packet may include a packet information header and a second streaming packet may include the payload. For example, the payload may include write data. It will be noted that the streaming packet may include additional data, e.g., error correction data, status flags, etc. which are not discussed in this specification for the purposes of simplicity. The packet information header may include a path field that can specify a path through the streaming interconnect 102. The path field information may be used by each streaming component in the streaming interconnect 102 to determine the next destination in the path, e.g., next stage of the pipeline.

The software streaming components 106 may include a plurality of software streaming components, for example, a software streaming component 1 106A, a software streaming component 2 106B, a software streaming component M−1 106C and a software streaming component M 106D. Each of the software streaming components 106 may be configured to perform one or more packet processing operations for the device 100. In some embodiments, each of the software streaming components 106 may include processors 1-K, where K can be an integer with a value equal to or greater than one. Each of the processors 1-K may be configured to write and read from the streaming buffers 104. In some embodiments, each of the processors 1-K may include one or more processor cores such as A57 by ARM®.

In some embodiments, each of the processors 1-K may be coupled to a cache or a cache hierarchy, e.g., Level 1, Level 2 cache and/or Level 3 cache. Each of the processors 1-K may be configured to execute instructions (e.g., software) that may be stored on a non-transitory computer-readable storage medium. The computer-readable storage medium may be in the form of a memory (not shown) that may be coupled to the processors 1-K. In some embodiments, the computer-readable storage media may include but are not limited to, parameter random access memory (PRAM), SRAM, DRAM, RAM, read only memory (ROM), electrically erasable programmable read-only memory (EEPROM), flash memory or other memory technology, compact disc (CD)-ROM, digital video disk (DVD) or other optical storage, magnetic cassettes, magnetic tape, magnetic disk storage or other magnetic storage devices, or any other medium which can be used to store the desired information and which can be accessed by the processor.

The streaming buffers 104 may be coupled to the software streaming components 106 comprising processors 1-K and to the streaming interconnect 102. The streaming buffers 104 may include a plurality of streaming buffers, for example, buffers 104A-buffers 104H. In some embodiments, each of the streaming buffers 104 may function as a first-in-first-out (FIFO) buffer. For example, each of the streaming buffers 104 may be implemented as a shift register, a list, a circular buffer or using any suitable memory structure to implement the FIFO functionality. The streaming buffers 104 may include control logic to provide read and write access to each of the streaming buffers 104 and buffering storage. For example, in some embodiments, the streaming buffers 104 may be implemented as on-chip memory, e.g., SRAMs (Static Random Access Memory), latches, flip-flops or any other suitable memory form. In some embodiments, buffering storage or memory for the streaming buffers 104 may be off-chip. In some embodiments, each of the streaming buffers 104 may include a component identifier that can be used to route packets to that streaming buffer. In some embodiments, each of the streaming buffers 104 may include a destination table that may be used to determine the next destination in the pipeline through the streaming interconnect 102.

The streaming buffers 104 may provide an interface between the processors 1-K and the streaming interconnect 102. In some embodiments of the technology, each of the software streaming components 106 comprising processors 1-K may be coupled to one or more streaming buffers from the streaming buffers 104. In some embodiments, one or more streaming buffers may be assigned to each processor for each direction of the packet flow, e.g., to and from the processors 1-K. For example, buffers 104A may be configured to queue streaming packets destined to one or more processors in the software streaming component 1 106A from the streaming interconnect 102. Buffers 104B may be configured to queue streaming packets destined to the streaming interconnect 102 from the one or more processors in the software streaming component 1 106A. Similarly, buffers 104C and buffers 104D may be coupled to the software streaming component 2 106B, buffers 104E and buffers 104F may be coupled to the software streaming component M-1 106C, and buffers 104G and buffers 104H may be coupled to the software streaming component M 106D. It will be noted that number of streaming buffers in each of buffers 104A-104H may vary for each processor and may be configured dynamically. In some embodiments, the streaming buffers 104 may also provide an interface between memory controllers (not shown) that are coupled to the processors (1-K) and the hardware streaming components 108. It will be noted that other implementations of moving data between the software streaming components 106 and the streaming buffers 104 are possible.

According to various embodiments of the disclosed technologies, assignment of the streaming buffers 104 to each processor for each direction of the packet flow can be defined dynamically by the software and may depend on a number of factors. In some embodiments, the streaming buffers may be assigned based on the type of traffic that may be flowing in to a particular streaming buffer. For example, the streaming packets may include different packet types that may vary based on the protocol or the functionalities (e.g., high performance computing, high performance networking, heavy block storage, etc.) supported by the device 100. Accordingly, certain streaming buffers may be assigned for certain types of streaming packets. In some embodiments, the streaming buffers may be assigned based on different quality levels serviced by each streaming buffer. For example, some streaming packet types may have high priority for processing as compared to other streaming packet types. Thus, in some instances, a first set of streaming buffers may be assigned for high priority packets for processing by certain processors and a second set of streaming buffers may be assigned for low priority packets for processing by other processors. In some embodiments, different streaming buffers may be assigned for different stages in the pipeline. For example, the end of pipeline may utilize different set of streaming buffers as compared to the beginning of the pipeline. In some embodiments, a particular set of streaming buffers from the streaming buffers 104 may be assigned by the software to be connected between a particular processor from the processors 1-K and a particular hardware streaming component from the hardware streaming components 108.

In some instances, the software streaming components 106 may provide more flexibility in processing the streaming packets as compared to the hardware streaming components 108. For example, in some embodiments, a packet processing pipeline may be dynamically reconfigured by the software to replace a software streaming component with another software streaming component, e.g., for bug fixes, software upgrades, to add new features, for protocol revisions, etc. In some embodiments, the software streaming components 106 may include general purpose processors. Further, in some instances, the software streaming components 106 may be capable of performing more complex packet processing operations as compared to the hardware streaming components 108.

The hardware streaming components 108 may include a plurality of hardware streaming components, e.g., a hardware streaming component 1 108A, a hardware streaming component 2 108B, a hardware streaming component 3 108C and a hardware streaming component N 108D. Each of the hardware streaming components 108 may be configured to perform one or more packet processing operations for the device 100. In some embodiments, each of the hardware streaming components 108 may include a component identifier that can be used to route packets to that hardware streaming component. In some embodiments, each of the hardware streaming components 108 may include a destination table that can include routing options for the next streaming component in the pipeline. Some non-limiting examples of the hardware streaming components 108 may include networking components (e.g., network accelerators, network interface controllers, network co-processors, etc.), storage components (e.g., Serial Advanced Technology Attachment (SATA) controllers), crypto accelerator components, Peripheral Component Interconnect (PCI) Express interface components, Ethernet interface components, wireless interface components (e.g., Wi-Fi), Universal Serial Bus (USB) interface components, etc.

In some instances, some of the hardware streaming components 108 may perform faster packet processing as compared to their software streaming components 106 substitute. According to some embodiments of the disclosed technology, streaming packets can be steered among hardware streaming components through the streaming interconnect 102 based on the packed information headers without any processor intervention or system memory bandwidth. The hardware streaming components 108 may include hardwired or burned logic (e.g., logic that cannot be reconfigured dynamically) and some configurable logic. In some embodiments, the hardware streaming components 108 may include ASICs (Application Specific Integrated Circuits), FPGAs (Field Programmable Gate Arrays), ASSPs (Application Specific Standard Parts), SoC components, etc.

The streaming interconnect 102 may allow routing the streaming packets through one or more configurable packet processing pipelines simultaneously. The streaming interconnect 102 may function as a fabric that can provide connectivity among all the streaming components, e.g., the software streaming components 106 and the hardware streaming components 108. For example, in some embodiments, the streaming interconnect 102 may be implemented as a packet switched network that can allow for simultaneous connections between multiple pairs of streaming components. The streaming interconnect 102 may be implemented as an interconnect fabric, a ring, a switch, buses, cross bars, mesh or any combination thereof. In some embodiments, the streaming interconnect 102 may include a unified interface with each of the software streaming components 106 and the hardware streaming components 108. In some embodiments, the streaming interconnect 102 may include a plurality of routers that can steer the streaming packets from one streaming component to another in each packet processing pipeline based. For example, in some embodiments, each streaming packet may include a packet information header that may include a path or a sequence of streaming components for a pipeline through the streaming interconnect 102 to process that streaming packet.

In some embodiments of the technology, each of the software streaming components 106 and hardware streaming components 108 may include unified input/output ports or streaming ports, i.e., interface between any of the streaming components and the streaming interconnect 102 may be the same. The unified streaming ports can allow the streaming interconnect 102 to be agnostic to the type of the streaming component communicating with the streaming interconnect 102 for each of the packet processing pipelines through the streaming interconnect 102. For example, a packet processing pipeline can be dynamically reconfigured to replace a hardware streaming component with a software streaming component or vice-versa without affecting the operation of the streaming interconnect 102. Thus, in different embodiments, having unified input/output ports can enable optimum configuration of the packet processing pipelines by the software for efficient processing of the streaming packets.

In some embodiments of the technology, one or more packet processing pipelines can be configured dynamically at boot time. For example, configuration of the pipelines can be part of boot software that may be executed when the device 100 is powered on. For example, software can dynamically define multiple packet processing pipelines that can integrate a plurality of software streaming components 106 and/or a plurality of hardware software streaming components 108. The multiple packet processing pipelines can coexist simultaneously through the streaming interconnect 102. For example, a first pipeline may include only hardware streaming components and a second pipeline may include only software streaming components. In some embodiments, one or more streaming components can be shared among multiple pipelines flowing through the streaming interconnect 102 simultaneously. In some embodiments, different packet processing pipelines may be defined based on the type of packets, content of packets, different protocol versions and functionalities (e.g., high performance computing, high performance networking, heavy block storage, etc.) supported by the device 100, priority level desired for processing the packets, quality level desired for processing the packets and any other suitable criteria. For example, in some embodiments, a first packet processing pipeline may include a first sequence of streaming components for a first type of packet and a second packet processing pipeline may include a second sequence of streaming components for a second type of packet.

Further, some embodiments of the disclosed technologies may allow paths for future software extensibility by providing the ability to insert software streaming components within the pipelines. In some instances, the streaming interconnect 102 may be dynamically reconfigured to include additional software streaming components to augment hardware packet processing by pipelines comprising hardware streaming components. For example, software streaming components may be inserted for particular packet processing operations, e.g., operations that may involve complex computations but may not be speed sensitive.

Various embodiments of the disclosed technologies can provide a flexible streaming infrastructure by allowing dynamic stitching of hardware and software streaming components to form multiple packet processing pipelines that can coexist simultaneously. Embodiments of the technology can allow the software to not only define potential streaming performance but also build the pipelines from a bag of parts, i.e., a set of hardware and software streaming components that can be mixed, matched, and configured to be optimized for different use cases.

Figure 2:
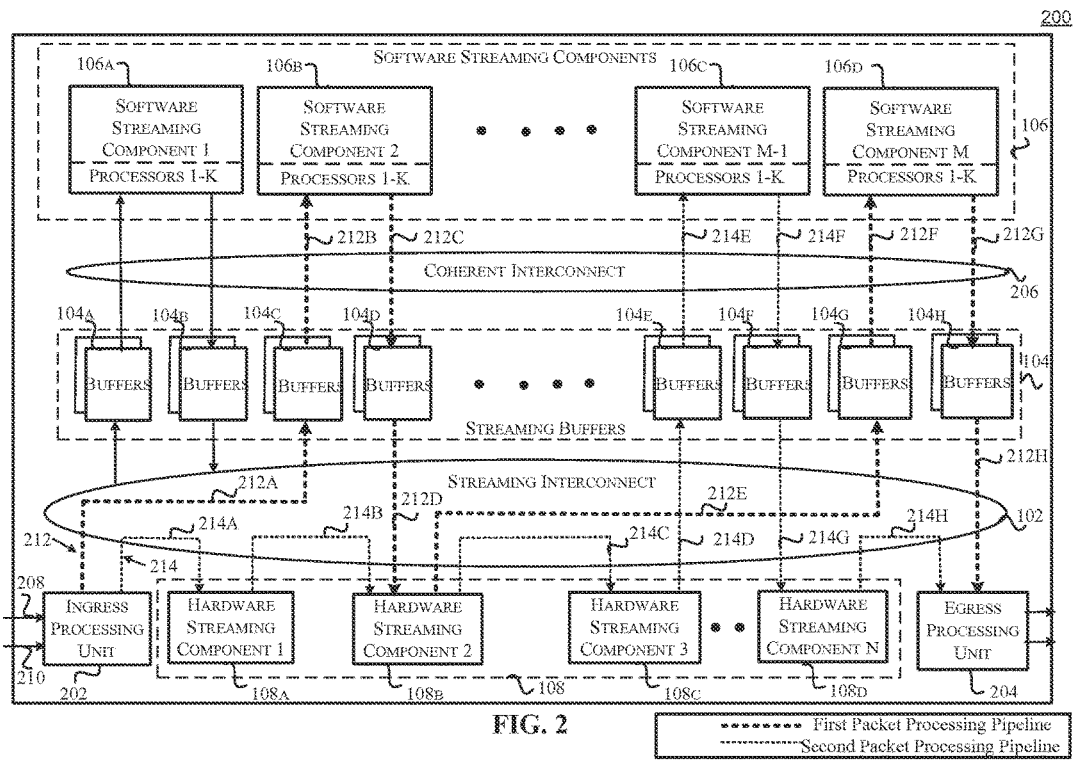
FIG. 2 illustrates a device comprising multiple pipelines for processing packets, according to some embodiments of the disclosed technology.

FIG. 2 illustrates a device 200 comprising multiple pipelines for processing multiple packets, according to some embodiments of the disclosed technology.

The device 200 may include an ingress processing unit 202, an egress processing unit 204 and a coherent interconnect 206 in addition to the software streaming components 106, streaming buffers 104, hardware streaming components 108 and streaming interconnect 102 as discussed with reference to FIG. 1. In some cases, at least a portion of the device 200 can be implemented as part of an SoC.

The ingress processing unit 202 may be configured to receive incoming packets and prepend a metadata header onto each packet. The incoming packet may include an original packet header and a payload. In some embodiments, the ingress processing unit 202 may split the incoming packet into two or more streaming packets and attach a metadata header to each of the streaming packets. For example, a first streaming packet may include a first metadata header and the original packet header and the second streaming packet may include a second metadata header and the payload. The first and the second streaming packets may be processed separately by different pipelines through the streaming interconnect 102, which may allow multiple streaming components to process different parts of the packet simultaneously. In some embodiments, the packet headers may be processed differently than the payload. For example, processing for the packet headers may be associated with encapsulation, network related functionalities, etc., and processing for the payload may be associated with encryption, compression, etc. In some embodiments, each metadata header may include a packet information header that may be used by the streaming components for steering the streaming packet through one or more packet processing pipelines within the streaming interconnect 102. Further, in some embodiments, each streaming component may be configured to modify the original packet header of a packet, e.g., to update routing of the packet through the streaming interconnect, to encapsulate or decapsulate the packet, etc. In some embodiments, a packet parser may decode the packet to determine a type of the packet. For example, the packet type can be used to determine a protocol version, a slow or a fast path for the packet, or any other relevant information that can be used for configuring the pipelines for that packet.

Figure 6A:
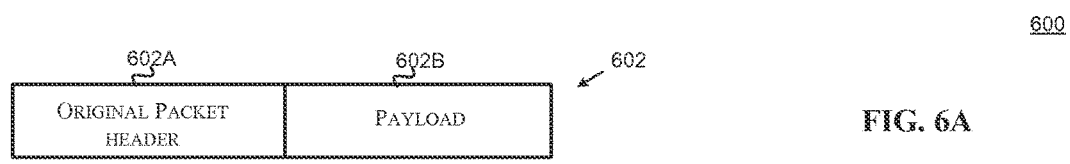
FIG. 6A illustrates an exemplary packet, according to some embodiments of the technology.

FIG. 6A illustrates an exemplary packet 602 that may include an original packet header 602A and a payload 602B. For example, the original packet header 602A may include control information that may be used for processing and forwarding the packet, e.g., error detection codes, checksum, source and destination addresses, packet identifier, packet type, protocol version, packet length, etc. The payload 602B may include the data for processing, e.g., encryption, compression, etc.

In some embodiments, the packet 602 may be split into two streaming packets in order to process the original packet header 602A and the payload 602B separately, as described with reference to FIGS. 6B and 6C. In some embodiments, the packet 602 may go through a packet parser (not shown) in order to split the packet into the original packet header 602A and the payload 602B. The packet parser may be part of the ingress processing unit 202 or may be an independent entity. In some embodiments, a packet information header may be attached to the original packet header 602A resulting in the first streaming packet 604 and another packet information header may be attached to the payload 602B resulting in the second streaming packet 606. Further, in some embodiments, the original packet header 602A may be modified, e.g., to update routing of the packet through the streaming interconnect, to encapsulate or decapsulate the packet, etc. The first streaming packet 604 and the second streaming packet 606 may be processed by different pipelines simultaneously, as described with reference to FIG. 2.

Figure 6B:
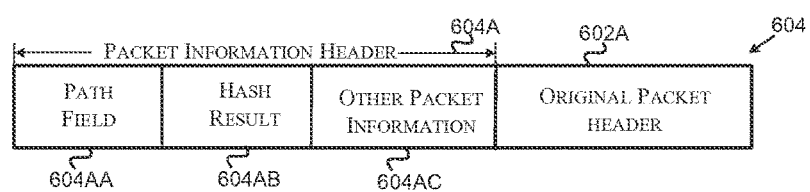
FIG. 6B illustrates an exemplary streaming packet including a meta data header attached to an original packet header, according to one embodiment of the technology.

FIG. 6B illustrates an exemplary first streaming packet 604 according to some embodiments of the technology. For example, the first streaming packet 604 may include a packet information header 604A that may be attached to the original packet header 602A by the ingress processing unit 202A. The packet information header 604A may include a path field 604AA, a hash result 604AB and other packet information 604AC. The other packet information 604AC may include information about packet types and other relevant information that may be used for packet processing.

In some embodiments, the path field 604AA may specify a path or a sequence of streaming components through the streaming interconnect 102 for a first packet processing pipeline. The hash result 604AB may specify a hash value that may be used by each streaming component to determine the next destination for the pipeline path through the streaming interconnect 102. Thus, the packet information header 604A may be used by the streaming components for routing the first streaming packet 604 through the streaming interconnect 102 for processing the information in the original packet header 602A.

Figure 6C:
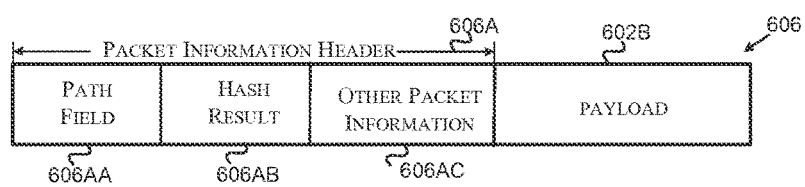
FIG. 6C illustrates an exemplary streaming packet including a meta data header attached to a payload, according to one embodiment of the technology.

FIG. 6C illustrates an exemplary second streaming packet 606 according to some embodiments of the technology. For example, the second streaming packet 606 may include a packet information header 606A that may be attached to the payload 602B by the ingress processing unit 202A. The packet information header 606A may include a path field 606AA, a hash result 606AB and other packet information 606AC. The other packet information 606AC may include information about packet types and other relevant information that may be used for packet processing. In some embodiments, the path field 606AA may specify a path or a sequence of streaming components through the streaming interconnect 102 for a second packet processing pipeline. The hash result 606AB may specify a hash value that may be used by each streaming component to determine the next destination for the pipeline path through the streaming interconnect 102. Thus, the packet information header 606A may be used by the streaming components for routing the second streaming packet 606 through the streaming interconnect 102 for processing the information in the payload 602B.

Figure 6D:
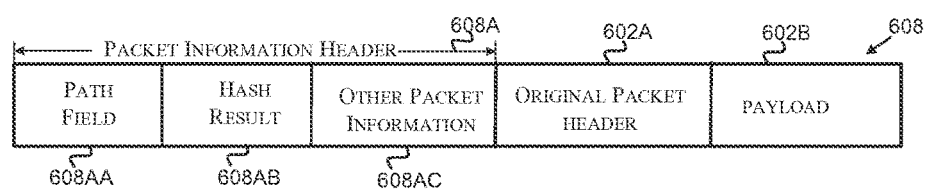
FIG. 6D illustrates an exemplary streaming packet including a meta data header attached to an original packet, according to one embodiment of the technology.

In some embodiments, a packet information header may be attached to the original packet without splitting the packet, as described with reference to FIG. 6D. For example, as shown in FIG. 6D, a streaming packet 608 may include a packet information header 608 that may be attached to the packet 602 comprising the original packet header 602A and the payload 602B. The packet information header 608A may include a path field 608AA, a hash result 608AB and other packet information 608AC. The streaming packet 608 may be processed by a packet processing pipeline that may comprise software streaming components and/or hardware streaming components. For example, in one embodiment, the software streaming components of the packet processing pipeline may perform packet processing operations related to the original packet header 602A and the hardware streaming components of the pipeline may perform packet processing operations related to the payload 602B.

Each streaming component may include a destination table that can be used to determine the next streaming component in the pipeline based on the path field in the respective packet information header. For example, each of the hardware streaming component 108 may include a destination table to determine the next destination. For example, the next destination may be another hardware streaming component or a streaming buffer coupled to a software streaming component. Similarly, each of the streaming buffers 104 may include a destination table to determine the next destination. For example, the next destination may be another streaming buffer coupled to another software streaming component or a hardware streaming component. In some embodiments, each packet type may correspond to a different destination table that may result in different sequence of streaming components through the streaming interconnect 102. For example, the other packet information from each respective packet information header may include one or more packet types that may vary based on the processing needs for each packet, protocol versions, functionalities supported by the I/O adapter device or a combination of different factors.

FIG. 6E illustrates an exemplary destination table 610 that may be used by a streaming component to determine the next streaming component in the pipeline based on the path field 610A. For example, the path field 610A may be the path field 604AA for the first streaming component 604 or the path field 606AA for the second streaming component 606. The destination table 610 may include destination routing option 610B that may vary based on the value of the path field 610A for each path. For example, for the path field 610A value of one, the destination routing option 610B may specify a single streaming component as the next destination for the path. In some instances, the path field 610A value of more than one (e.g., two, three or four) may indicate that multiple options may be specified for a path. Accordingly, a destination may be selected from a list of multiple streaming component destinations based on one of the algorithms. For example, for the path field 610A value of two, the next destination may be selected from the list of multiple streaming component destinations based on round robin arbitration. In some instances, for the path field 610A value of three, the next destination may be selected from a list of multiple streaming component destinations based on which destination has the lightest load during that time. For example, for software streaming components, the load may be determined based on the availability of the streaming buffers. For example, in some instances, a software streaming component coupled to a streaming buffer with the lightest load (e.g., shortest queue) may be selected as the next destination. In some instances, for the path field 610A value of four, the next destination may be selected from a list of multiple streaming component destinations based on the hash result included in the respective packet information header, e.g., the hash result 604AB or the hash result 606AB. In some embodiments, actual supported destination routing option and the size of the destination table may vary for each streaming component based on the functionality requirement of the streaming component. For example, if a particular streaming component is configured to perform packet processing operation for networking versus storage may determine the destination routing option 610B and the size of the destination table 610 supported by that streaming component.

In some instances, when the path field 610A information in a streaming packet is missing or is irrelevant, the path of the pipeline may be dynamically altered by steering the pipeline to the processor for further processing. In some other instances, if a hardware streaming component cannot perform the packet processing operation for some reason (e.g., insufficient information, malfunction, etc.), path of the pipeline may be dynamically altered by steering the pipeline to the processor for further processing.

In various embodiments of the disclosed technologies, selection of the destination routing option 610B for each streaming component may be dynamically configurable. For example, in some instances, the fixed destination routing option (e.g., path field 610A value equal to one) may be defined for hardware streaming components and the multiple destinations routing option (e.g., path field 610A value greater than one) may be defined for software streaming components. In some embodiments, the path field 610A value may be changed by any streaming component along the path to dynamically alter the path. For example, in some instances, a software streaming component may change the fixed destination to replace one streaming component with another for the path field 610A value of one. In some embodiments, a hardware streaming component may be replaced by a software streaming component or vice-versa.

Referring back to FIG. 2, the egress processing unit 204 may be configured to detach the packet information header 604A from the first streaming packet 604 and the packet information header 606A from the second streaming packet 606 as the packets leave the respective pipelines through the streaming interconnect 102. In some embodiments, the payload 602B and the original packet header 602A may be combined to reproduce the packet 602 before sending the packet 602 out to further processing.

The coherent interconnect 206 may be configured to provide connectivity between the streaming buffers 104 and the software streaming components 106. In some embodiments, one or more memories may be coupled to the coherent interconnect 206 via memory controllers (not shown). For example, the memories may be configured to store instructions that may be used by the processors 1-K, e.g., for processing the streaming packets. In some embodiments, the coherent interconnect 206 may be configured to maintain coherency between the caches (e.g., associated with the processors 1-K), memories and the streaming buffers 104. According to various embodiments of the disclosed technologies, only the streaming packets that are routed to and from the software streaming components 106 may consume coherent network 206 bandwidth and the streaming packets that are steered only among the hardware streaming components 108 leveraging integrated routers in the streaming interconnect 102 may not utilize the coherent network 206 bandwidth or processor intervention. Further, in some embodiments, processing of the payload by the streaming components through the packet processing pipeline in the streaming interconnect 102 may avoid any accesses to external memory via memory controllers (not shown) coupled to the coherent interconnect 206. Thus the streaming infrastructure according to various embodiments of the disclosed technologies can provide more efficient bandwidth utilization of the processors and the system memory.

As illustrated in FIG. 2, the ingress unit 202 may receive a first packet 208 and a second packet 210 for processing. The first packet 208 and the second packet 210 may include different packet types. In one embodiment, the first packet 208 and the second packet 210 may be the first streaming packet 604 and the second streaming packet 606 respectively as discussed with reference to FIGS. 6B and 6C. For example, the first packet 208 may be the original packet header 602A and the second packet 210 may be the payload 602B for a packet that may have gone through a packet parser to produce the first packet 208 and the second packet 210. In another embodiment, the first packet 208 and the second packet 210 may be two independent packets and the ingress processing unit 202 may attach separate packet information headers to each of the first packet 208 and the second packet 210. The first packet 208 and the second packet 210 may be processed by two separate pipelines through the streaming interconnect 102. In one embodiment, the device 200 may include a packet processing pipeline 212 and a packet processing pipeline 214 that can coexist simultaneously within the streaming interconnect 102. The packet processing pipeline 212 may be configured to process the first packet 208 and the packet processing pipeline 214 may be configured to process the second packet 210.

The packet processing pipeline 212 may include a first sequence of streaming components comprising a software streaming component 2 106B, a hardware streaming component 2 108B and a software streaming component M 106D. The packet processing pipeline 214 may include a second sequence of streaming components comprising a hardware streaming component 1 108A, a hardware streaming component 2 108B, a hardware streaming component 3 108C, a software streaming component M-1 106C and a hardware streaming component N 108D. Note that FIG. 2 shows the hardware streaming component 2 108B shared between the packet processing pipelines 212 and 214, however, none or more streaming components may be shared between the two pipelines.

The first packet 208 may be of a first packet type and a second packet 210 may be of a second packet type. The ingress processing unit 202 may attach a first packet information header to the first packet 208 to provide a first streaming packet for processing and a second packet information header to the second packet 210 to provide a second streaming packet for processing. The packet information header for each packet may include a corresponding path field. In some embodiments, the packet information headers may be configured by the software at boot time or dynamically. For example, the packet information header may be configured based on the packet type, protocol version, functionality supported by the device or any suitable criteria for each streaming packet. For example, in some instances, certain packet processing tasks may have faster processing time requirement that can be efficiently performed by certain hardware streaming components as compared to certain packet processing tasks that may be highly complex but not as timing critical, thus suitable for processing by software streaming components.

In step 212A, the ingress processing unit 202 may determine that the first streaming packet is destined for the software streaming component 2 106B based on the first packet information header. The ingress processing unit 202 may forward the first streaming packet with the first packet information header via the streaming interconnect 102 to the buffers 104C coupled to the software streaming component 2 106B. The buffers 104C may queue the first streaming packet for processing by the software streaming component 2 106B.

In step 212B, the buffers 104C may access its destination table (e.g., similar to the destination table 610) and determine the destination routing option based on the path field in the first streaming packet. For example, the buffers 104C may determine the destination to be one or more processors in the software streaming component 2 106B. The buffers 104C may send the streaming packet to the software streaming component 2 106B based on the order of the queue. For example, in some instances, the buffers 104C may store other streaming packets that may need to be processed first by the one or more processors in the software streaming component 2 106B.

In step 212C, the one or more processors from the processors 1-K in the software streaming component 2 106B may perform the packet processing operation on the streaming packet received from the buffers 104C. The software streaming component 2 106B may send the streaming packet to the buffers 104D. The buffers 104D may queue the streaming packet based on the order of the queue.

In step 212D, the buffers 104D may access its destination table and determine the destination routing option based on the path field in the first streaming packet. For example, the buffers 104D may determine the destination to be the hardware streaming component 2 108B. The buffers 104D may forward the first streaming packet to the hardware streaming component 2 108B via the streaming interconnect 102.

In step 212E, the hardware streaming component 2 108B may perform the packet processing operation on the first streaming packet received from the buffers 104D. Next, the hardware streaming component 2 108B may access its destination table and determine the destination routing option based on the path field in the first streaming packet. Based on the destination routing option, the hardware streaming component 2 108B may determine the next destination in the first packet processing pipeline 212 to be the software streaming component M 106D. The hardware streaming component 2 108B may forward the streaming packet via the streaming interconnect 102 to the buffers 104G coupled to the software streaming component M 106D. The buffers 104G may queue the first streaming packet based on the order of the queue.

In step 212F, the buffers 104G may access its destination table and determine the destination routing option based on the path field in the first streaming packet. For example, the buffers 104G may determine the destination to be one or more processors in the software streaming component M 106D. The buffers 104G may send the streaming packet to the software streaming component M 106D based on the order of the queue. For example, in some instances, the buffers 104G may store other streaming packets that may need to be processed first by the one or more processors in the software streaming component M 106D.

In step 212G, the one or more processors from the processors 1-K in the software streaming component M 106D may perform the packet processing operation on the first streaming packet received from the buffers 104G. The software streaming component M 106D may send the first streaming packet to the buffers 104H. The buffers 104H may queue the first streaming packet based on the order of the queue.

In step 212H, the buffers 104H may decode the path field information in the packet information header and determine that the first streaming packet is destined to the egress processing unit 204. The buffers 104D may forward the first streaming packet to the egress processing unit 204 via the streaming interconnect 102. The egress processing unit 204 may detach the packet information header from the first streaming packet. In some embodiments, the egress processing unit 204 may determine if the first streaming packet is a packet header for a packet and may attach the payload to the first streaming packet before sending it out for further processing, e.g., the first streaming packet may be the original packet header 602A or a modified packet header and the second streaming packet may be the payload 602B, as discussed with reference to FIG. 6A. For example, in some embodiments, the first streaming packet may include a packet header that has been modified by one or more streaming components in the packet processing pipeline 212 to encapsulate/decapsulate the streaming packet or to alter the path of the streaming packet through the streaming interconnect 102.

The streaming interconnect 102 may allow multiple pipelines to flow through the streaming interconnect 102 simultaneously for processing multiple streaming packets. For example, while the first packet processing pipeline 212 is flowing through the streaming interconnect 102, the second packet processing pipeline 214 can flow through the streaming interconnect 102 as described below.

In step 214A, the ingress processing unit 202 may determine that the second streaming packet is destined for the hardware streaming component 1 108A based on the second packet information header. The ingress processing unit 202 may forward the second streaming packet with the second packet information header to the hardware streaming component 1 108A via the streaming interconnect 102.

In step 214B, the hardware streaming component 1 108A may perform the packet processing operation on the second streaming packet received from the ingress processing unit 202. Next, the hardware streaming component 1 108A may access its destination table and determine the destination routing option based on the path field in the second streaming packet. Based on the destination routing option, the hardware streaming component 1 108A may determine the next destination in the second packet processing pipeline 214 to be the hardware streaming component 2 108B. The hardware streaming component 1 108A may forward the second streaming packet to the hardware streaming component 2 108B via the streaming interconnect 102. Note that the hardware streaming component 2 108B may be shared between the first packet processing pipeline 212 and the second packet processing pipeline 214 but may or may not be used by both the pipelines simultaneously.

In step 212C, the hardware streaming component 2 108B may perform the packet processing operation on the second streaming packet received from the hardware streaming component 1 108A. Next, the hardware streaming component 2 108B may access its destination table and determine the destination routing option based on the path field in the second streaming packet. Based on the destination routing option, the hardware streaming component 2 108B may determine that the second streaming packet is destined to the hardware streaming component 3 108C. The hardware streaming component 2 108B may forward the second streaming packet via the streaming interconnect 102 to the hardware streaming component 3 108C.

In step 214D, the hardware streaming component 3 108C may perform the packet processing operation on the second streaming packet received from the hardware streaming component 2 108B. Next, the hardware streaming component 3 108C may access its destination table and determine the destination routing option based on the path field in the second streaming packet. Based on the destination routing option, the hardware streaming component 3 108C may determine that the second streaming packet is destined to the software streaming component M-1 106C. The hardware streaming component 3 108C may forward the second streaming packet via the streaming interconnect 102 to the buffers 104E coupled to the software streaming component M-1 106C. The buffers 104E may queue the second streaming packet based on the order of the queue.

In step 214E, the buffers 104E may access its destination table and determine the destination routing option based on the path field in the second streaming packet. For example, the buffers 104E may determine the destination to be one or more processors in the software streaming component M-1 106C. The buffers 104E may send the streaming packet to the software streaming component M-1 106C based on the order of the queue. For example, in some instances, the buffers 104E may store other streaming packets that may need to be processed first by the one or more processors in the software streaming component M-1 106C.

In step 214F, the one or more processors from the processors 1-K in the software streaming component M-1 106C may perform the packet processing operation on the second streaming packet received from the buffers 104E. The software streaming component M-1 106C may send the second streaming packet to the buffers 104F. The buffers 104F may queue the second streaming packet based on the order of the queue.

In step 214G, the buffers 104F may access its destination table and determine the destination routing option based on the path field in the second streaming packet. For example, the buffers 104F may determine the destination to be the hardware streaming component N 108D. The buffers 104F may forward the second streaming packet to the hardware streaming component N 108D via the streaming interconnect 102.

In step 214H, the hardware streaming component N 108D may perform the packet processing operation on the second streaming packet received from the buffers 104F. Next, the hardware streaming component N 108D may access its destination and determine the destination routing option based on the path field in the second streaming packet. Based on the destination routing option, the hardware streaming component N 108D may determine that the second streaming packet is destined to the egress processing unit 204. The hardware streaming component N 108D may forward the second streaming packet to the egress processing unit 204 via the streaming interconnect 102. The egress processing unit 204 may detach the packet information header from the second streaming packet. In some embodiments, the egress processing unit 204 may determine if the second streaming packet is a payload for a packet and may attach the packet header to the second streaming packet before sending it out for further processing, e.g., the first streaming packet may be the original packet header 602A and the second streaming packet may be the payload 602B, as discussed with reference to FIG. 6A.

In some embodiments, the path field in a streaming packet may be updated along the path of the packet processing pipeline to dynamically alter the path by the preceding streaming component. For example, the path may be altered due to missing or irrelevant destination routing option in a hardware streaming component, malfunction of a hardware streaming component, software update, live updates, bug fixes, use of a software streaming component in place of the hardware streaming component or in addition to the hardware streaming component, use of a hardware streaming component in place of the software streaming component, etc.

Figure 3:
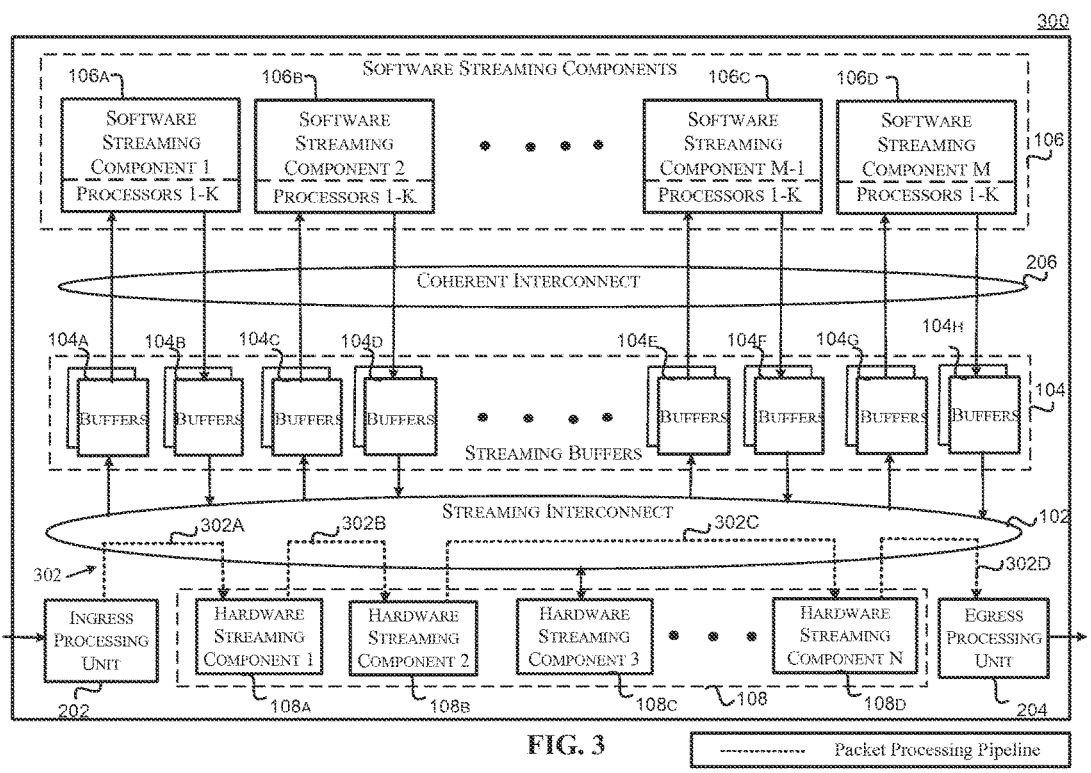
FIG. 3 illustrates a device including a pipeline comprising hardware streaming components, according to some embodiments of the disclosed technology.

FIG. 3 illustrates a device 300 including a pipeline comprising hardware streaming components, according to some embodiments of the disclosed technology.

The device 300 may include components similar to device 200 as described with reference to FIG. 2. The device 300 may include a packet processing pipeline 302 comprising only hardware streaming components. In some cases, at least a portion of the device 300 can be implemented as part of an SoC.

In some embodiments, one of the packet processing pipelines may include a sequence of hardware streaming components, e.g. the hardware streaming component 1 108A, hardware streaming component 2 108B and the hardware streaming component N 108D. Note that in some instances, the hardware streaming component 3 108C and the software streaming components 1-M may be part of other pipelines that can coexist simultaneously with the packet processing pipeline 302 and are not shown here for the purpose of simplicity.

As illustrated in FIG. 3, the ingress processing unit 202 may receive a packet for processing. The packet may be similar to the packet 602 as described with reference to FIG. 6A or the packet may already be parsed into the original packet header 602A or the payload 602B. The ingress processing unit 202 may prepend an appropriate packet information header to the packet, e.g., the packet information header 606A, if the packet includes the payload 602B. The packet information header 606A may be configured by the software at boot time or dynamically. For example, the packet information header 606A may be configured based on the packet type, protocol version, functionality supported by the device or any suitable criteria to include certain hardware streaming components in the pipeline 302. For example, in some instances, certain packet processing tasks may have faster processing time requirement that can be efficiently performed by certain hardware streaming components as compared to certain packet processing tasks that may be highly complex but not as timing critical, thus suitable for processing by software streaming components.

In step 302A, the ingress processing unit 202 may determine the hardware streaming component 1 108A as the first destination in the sequence based on the packet information header 606A. The ingress processing unit 202 may forward the streaming packet with the packet information header 606A to the hardware streaming component 1 108A via the streaming interconnect 102. The hardware streaming component 1 108A may perform the packet processing operation after receiving the streaming packet.

In step 302B, the hardware streaming component 1 108A may perform the packet processing operation on the streaming packet received from the ingress processing unit 202. Next, the hardware streaming component 1 108A may access its destination table (e.g., similar to the destination table 610) and determine the destination routing option 610B based on the path field 610A in the streaming packet. Based on the destination routing option 610B, the hardware streaming component 1 108A may determine the next destination in the packet processing pipeline 302 to be the hardware streaming component 2 108B. The hardware streaming component 1 108A may forward the streaming packet to the hardware streaming component 2 108B via the streaming interconnect 102.

In step 302C, the hardware streaming component 2 108B may perform the packet processing operation on the streaming packet received from the hardware streaming component 1 108A. Next, the hardware streaming component 2 108B may access its destination table (e.g., similar to the destination table 610) and determine the destination routing option 610B based on the path field 610A in the streaming packet. Based on the destination routing option 610B, the hardware streaming component 2 108B may determine the next destination in the packet processing pipeline 302 to be the hardware streaming component N 108D. The hardware streaming component 2 108B may forward the streaming packet to the hardware streaming component N 108D via the streaming interconnect 102.

In step 302D, the hardware streaming component N 108D may perform the packet processing operation on the streaming packet received from the hardware streaming component 2 108B. Next, the hardware streaming component N 108D may access its destination table (e.g., similar to the destination table 610) and determine the destination routing option 610B based on the path field 610A in the streaming packet. Based on the destination routing option 610B, the hardware streaming component N 108D may determine that the packet is destined to the egress processing unit 204. The hardware streaming component N 108D may forward the streaming packet to the egress processing unit 204 via the streaming interconnect 102. The egress processing unit 204 may detach the packet information header 606A from the streaming packet and attach the original packet header or a modified packet header to the streaming packet (e.g., the payload 602B) before sending it out for further processing. For example, in some embodiments, the streaming packet may include a packet header that has been modified by one or more streaming components in the packet processing pipeline 302 to encapsulate/decapsulate the streaming packet or to alter the path of the streaming packet through the streaming interconnect 102.

As discussed above with reference to FIG. 3, the streaming packet can be steered through the pipeline 302 without utilizing any access to the processors 1-K or the coherent interconnect 206 (e.g., for memory access), thus saving the interconnect bandwidth. In some embodiments, the path field in the streaming packet may be updated along the path of the packet processing pipeline 302 to dynamically alter the path by the preceding streaming component. For example, the path may be altered based on a number of factors such as missing or irrelevant destination routing option 610B in a hardware streaming component, malfunction of a hardware streaming component, use of a software streaming component in place of the hardware streaming component or in addition to the hardware streaming component.

Figure 4:
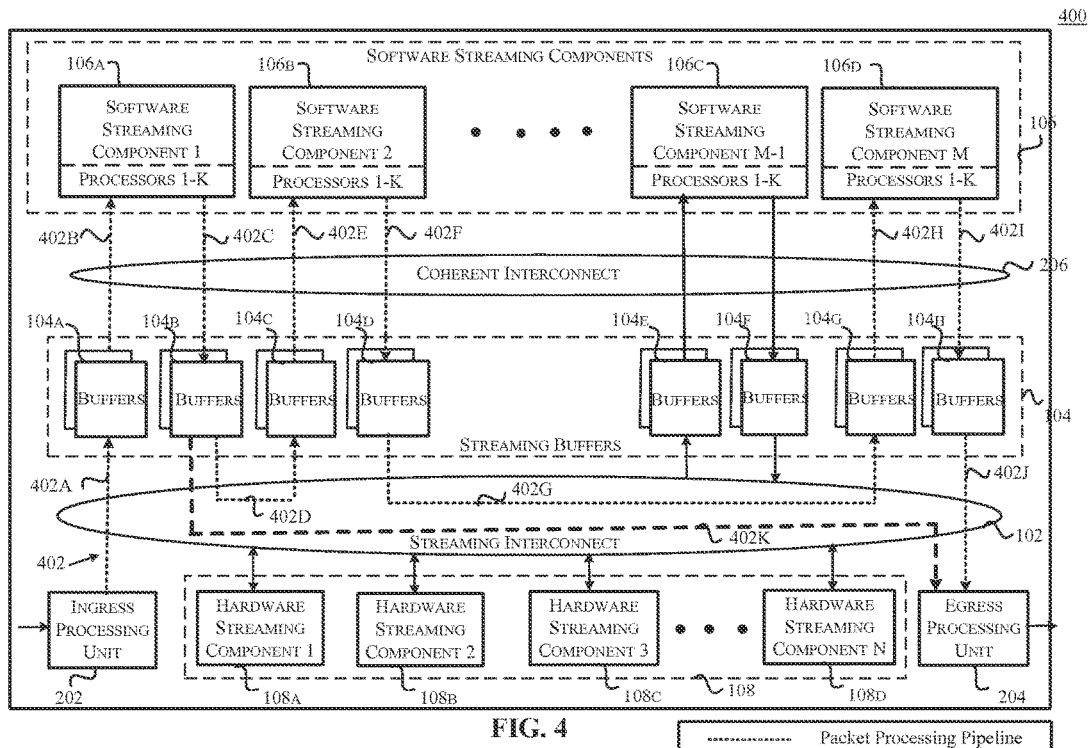
FIG. 4 illustrates a device including a pipeline comprising software streaming components, according to some embodiments of the disclosed technology.

FIG. 4 illustrates a device 400 comprising a pipeline for processing packets using software streaming components, according to some embodiments of the disclosed technology. In some cases, at least a portion of the device 400 can be implemented as part of an SoC.

The device 400 can include a packet processing pipeline 402 comprising a sequence of software streaming components. The ingress processing unit 202 may receive a packet for processing. The packet may be similar to the packet 602 as described with reference to FIG. 6A or the packet may already be parsed into the original packet header 602A or the payload 602B. The ingress processing unit 202 may prepend an appropriate packet information header to the packet, e.g., the packet information header 604A, if the packet includes the original packet header 602A. The packet information header 604A may be configured by the software at boot time or dynamically. For example, the packet information header 604A may be configured based on the packet type, protocol version, functionality supported by the device or any suitable criteria to include certain software streaming components in the pipeline 402. For example, in some instances, certain packet processing operations may include some complex processing tasks that may not be as timing critical, thus may be suitable for processing by software streaming components as compared to certain packet processing operations that may not be highly complex but may be more timing critical.

In step 402A, the ingress processing unit 202 may determine the software streaming component 1 106A as the first destination in the sequence based on the packet information header 604A. The ingress processing unit 202 may forward the streaming packet with the packet information header 604A via the streaming interconnect 102 to the buffers 104A that are coupled to the software streaming component 1 106A. The buffers 104A may queue the streaming packet for processing by the software streaming component 1 106A. For example, in some embodiments, the buffers 104A may be implemented as a set of FIFOs and may include other streaming packets that may be part of other pipelines that are being routed through the streaming interconnect 102 simultaneously.

In step 402B, the buffers 104A may access its destination table (e.g., similar to the destination table 610) and determine the destination routing option 610B based on the path field 610A in the streaming packet. For example, the buffers 104A may determine the destination to be the software streaming component 1 106A. The buffers 104A may send the streaming packet to the software streaming component 1 106A based on the order of the queue. For example, in some instances, the buffers 104A may store other streaming packets that may need to be processed first by the one or more processors in the software streaming component 1 106A.

In step 402C, the one or more processors from the processors 1-K in the software streaming component 1 106A may perform the packet processing operation on the streaming packet received from the buffers 104A. The software streaming component 1 106A may send the streaming packet to the buffers 104B. The buffers 104B may queue the streaming packet based on the order of the queue.

In step 402D, the buffers 104B may access its destination table (e.g., similar to the destination table 610) and determine the destination routing option 610B based on the path field 610A in the streaming packet. For example, the buffers 104B may determine the destination to be the software streaming component 2 106B. The buffers 104B may forward the streaming packet to the buffers 104C coupled to the software streaming component 2 106B via the streaming interconnect 102. The buffers 104C may queue the streaming packet for processing by the software streaming component 2 106B.

In step 402E, the buffers 104C may access its destination table (e.g., similar to the destination table 610) and determine the destination routing option 610B based on the path field 610A in the streaming packet. For example, the buffers 104C may determine the destination to be the software streaming component 2 106B. The buffers 104C may send the streaming packet to the software streaming component 2 106B based on the order of the queue. For example, in some instances, the buffers 104C may store other streaming packets that may need to be processed first by the one or more processors in the software streaming component 2 106B.

In step 402F, the one or more processors from the processors 1-K in the software streaming component 2 106B may perform the packet processing operation on the streaming packet received from the buffers 104C. The software streaming component 2 106B may send the streaming packet to the buffers 104D. The buffers 104D may queue the streaming packet based on the order of the queue.

In step 402G, the buffers 104D may access its destination table (e.g., similar to the destination table 610) and determine the destination routing option 610B based on the path field 610A in the streaming packet. For example, the buffers 104D may determine the destination to be the software streaming component M 106D. The buffers 104D may forward the streaming packet to the buffers 104D coupled to the software streaming component M 106D via the streaming interconnect 102. The buffers 104G may queue the streaming packet for processing by the software streaming component M 106D.

In step 402H, the buffers 104G may access its destination table (e.g., similar to the destination table 610) and determine the destination routing option 610A based on the path field 610B in the streaming packet. For example, the buffers 104G may determine the destination to be one or more processors in the software streaming component M 106D. The buffers 104G may send the streaming packet to the software streaming component M 106D based on the order of the queue. For example, in some instances, the buffers 104G may store other streaming packets that may need to be processed first by the one or more processors in the software streaming component M 106D.

In step 402I, the one or more processors from the processors 1-K in the software streaming component M 106D may perform the packet processing operation on the streaming packet received from the buffers 104G. The software streaming component M 106D may send the streaming packet to the buffers 104H. The buffers 104H may queue the streaming packet based on the order of the queue.

In step 402J, the buffers 104H may decode the path field information in the packet information header and determine that the packet is destined to the egress processing unit 204. The buffers 104D may forward the streaming packet to the egress processing unit 204 via the streaming interconnect 102. The egress processing unit 204 may detach the packet information header from the streaming packet and attach the payload to the streaming packet before sending it out for further processing.

In some embodiments, the path field 604AA in the streaming packet may be updated along the path of the packet processing pipeline 402 to dynamically alter the path by the preceding streaming component. For example, the path may be altered based on a number of factors such as missing or irrelevant destination routing option 610B in a software streaming component, software updates, use of a hardware streaming component in place of the software streaming component or in addition to the software streaming component, e.g., to gain speed in certain packet processing operations.

In some embodiments, the packet processing pipeline 402 may be implemented only by one of the software streaming component or by one of the processors. For example, in one embodiment, the ingress processing unit 202 may send the streaming packet including the packet information header to the buffers 104A, as discussed with reference to step 402A. The buffers 104A may forward the streaming packet to the software streaming component 1 106A for processing by the one or more processors 1-K, as discussed with reference to step 402B. One or more processors 1-K may perform one or more packet processing operations on the streaming packet and forward to the buffers 104B, as discussed with reference to step 402C. The buffers 104B may alter the path field of the streaming packet to indicate the next destination as the egress processing unit 204, as shown in step 402K. The egress processing unit 204 may detach the packet information header from the streaming packet and attach the payload to the streaming packet before sending it out for further processing.

In some embodiments, a packet processing pipeline using only the software streaming components may be implemented using the coherent interconnect 206. For example, a streaming packet may be routed from one software streaming component to another software streaming component via the coherent interconnect 206 without going through the streaming buffers 104 or the streaming interconnect 102. For example, in some embodiments, a field in the packet information header (e.g., other packet information) may indicate routing the streaming packets via the coherent interconnect only. This may allow for a faster low latency path for processing the packets as compared to going through the streaming buffers 104 and the streaming interconnect 102.

Figure 5A:
FIG. 5A illustrates a first packet processing pipeline, according to some embodiments of the disclosed technology.

FIG. 5A illustrates the first packet processing pipeline 212 as discussed with reference to FIG. 2. For example, the packet processing pipeline 212 may include a first sequence comprising the software streaming component 2 106B, the hardware streaming component 2 108B and the software streaming component M 106D. In some instances, path of the first packet processing pipeline 212 may be altered by updating the path field in the first streaming packet by any component along the path.

Figure 5B:
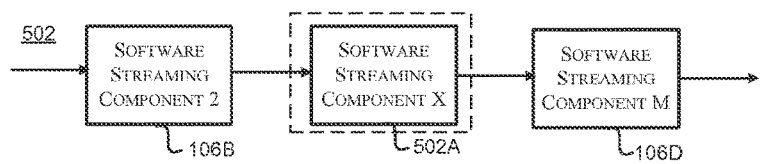
FIG. 5B illustrates a packet processing pipeline that includes an updated path of the first packet processing pipeline, according to some embodiments of the disclosed technology.

FIG. 5B illustrates a packet processing pipeline 502 that includes an updated path of the first packet processing pipeline 212, according to some embodiments of the disclosed technologies. As illustrated in FIG. 5B, the packet processing pipeline 502 may include a software streaming component X 502A in place of the hardware streaming component 2 108B. In some instances, the software streaming component 2 106B may alter the next destination in the first packet processing pipeline 212 to be the software streaming component X 502A in place of the hardware streaming component 2 108B resulting in the packet processing pipeline 502. For example, if the destination address (e.g., Media Access Control (MAC) address) for the hardware streaming component 2 108B is not available or is incorrect, the software streaming component 2 106B may steer the streaming packet to the processor (in the software streaming component X 502A) for determining the destination address for the hardware streaming component 2 108B, e.g. by performing an Address Resolution Protocol (ARP) to determine the MAC address. In some instances, the hardware streaming component 2 108B may be replaced by the software streaming component X 502A when silicon area outweighs the processing speed.

Figure 5C:
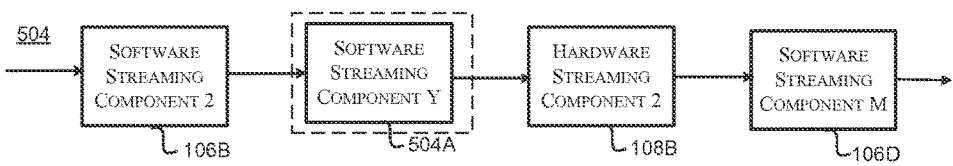
FIG. 5C illustrates a packet processing pipeline that includes an updated path of the first packet processing pipeline, according to some embodiments of the disclosed technology.

FIG. 5C illustrates a packet processing pipeline 504 that includes an updated path of the first packet processing pipeline 212, according to some embodiments of the disclosed technologies. As illustrated in FIG. 5C, the packet processing pipeline 504 may include a software streaming component Y 504A inserted between the software streaming component 2 106B and the hardware streaming component 2 108B. In some instances, the software streaming component 2 106B may alter the next destination in the first packet processing pipeline 212 to include the software streaming component Y 504A before the hardware streaming component 2 108B resulting in the packet processing pipeline 504. For example, the software streaming component Y 504A may be inserted to augment the packet processing capabilities of the hardware streaming component 2 108B or to compensate for any bug fixes in the hardware streaming component 2 108B logic.

Figure 5D:
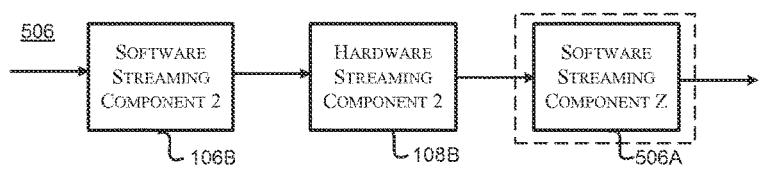
FIG. 5D illustrates a packet processing pipeline that includes an updated path of the first packet processing pipeline, according to some embodiments of the disclosed technology.

FIG. 5D illustrates a packet processing pipeline 506 that includes an updated path of the first packet processing pipeline 212, according to some embodiments of the disclosed technologies. As illustrated in FIG. 5D, the packet processing pipeline 506 may include a software streaming component Z 506A in place of the software streaming component M 106D. For example, in some instances, the hardware streaming component 2 108B may be reconfigured to alter the next destination in the first packet processing pipeline 212 to include the software streaming component Z 506A in place of the software streaming component M 106D resulting in the packet processing pipeline 506. For example, the software streaming component Z 506A may be added to provide any bug fixes or software updates. For example, the software updates may relate to protocol revisions, to augment hardware packet processing or any other relevant updates.

Figure 5E:
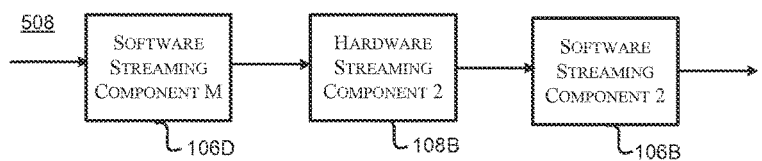
FIG. 5E illustrates a packet processing pipeline that includes an updated path of the first packet processing pipeline with reordered streaming components, according to some embodiments of the disclosed technology.

FIG. 5E illustrates a packet processing pipeline 508 that includes an updated path of the first packet processing pipeline 212 by reordering some of the streaming components, according to some embodiments of the disclosed technologies. As illustrated in FIG. 5E, the first packet processing pipeline 212 may be reconfigured to swap the software streaming component 2 106B with the software streaming component M 106D. Note that in instances when a streaming component is shared by multiple pipelines, the shared streaming component may be replaced in one pipeline without affecting the other pipeline. For example, referring back to FIG. 2, the hardware streaming component 2 108B may be shared by the first packet processing pipeline 212 and the second packet processing pipeline 214. Replacing the hardware streaming component 2 108B with the software streaming component X 502A in one instance, as shown in FIG. 5B, may only affect the first packet processing pipeline 212, while the second packet processing pipeline 214 can still use the hardware streaming component 2 108B.

As discussed above with reference to FIGS. 5A-5E, some embodiments of the disclosed technologies can allow performing live updates of the software without powering down the device. For example, a first packet processing pipeline can be changed to a second packet processing pipeline for a new packet flow without powering down the device and without affecting the operation of the streaming interconnect 102.

Figure 7A:
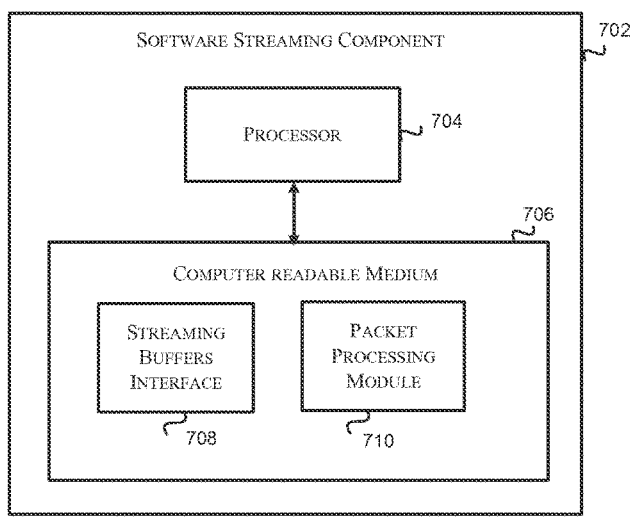
FIG. 7A illustrates an exemplary block diagram of a software streaming component, according to one embodiment of the disclosed technology.

FIG. 7A illustrates an exemplary block diagram of a software streaming component, in accordance with one embodiment of the technology.

FIG. 7A illustrates a software streaming component 702 that may be part of the device 100 as discussed with reference to FIG. 1. For example, the software streaming component 702 may be part of the software streaming components 106. The software streaming component 702 may include a processor 704 and a computer readable medium 706 coupled to the processor 704. For example, the processor 704 may include one or more processors 1-K as discussed with reference to FIG. 1. In some embodiments, the software streaming component 702 may be configured to perform one or more packet processing operations for a device, e.g., device 100. It will be understood that the software streaming component 702 may include more or less components than shown in FIG. 7A to provide the intended functionality.

The processor 704 may be configured to execute instructions stored in the computer readable medium 706. The computer readable medium 706 may be non-transitory. The processor 704 may include one or more processor cores such as A57 by ARM®. In some embodiments, the processor 704 may also be coupled to one or more caches, e.g., L1 cache, L2 cache, L3 cache, etc. The computer readable medium 706 may be in the form of a memory, e.g., SRAM, DRAM, DDRx SDRAM, etc., and may be internal or external to the device 100. In some embodiments, the computer readable medium 706 may include a streaming buffers interface 708 and a packet processing module 710.

The streaming buffers interface 708 may be configured to provide an interface with the streaming buffers 104. For example, the streaming buffers interface 708 may include a first interface for writing into a first set of streaming buffers from the streaming buffers 104 and a second interface for reading from a second set of streaming buffers from the streaming buffers 104. In some embodiments, the streaming buffers interface 708 may be configured to provide an interface with the streaming buffers 104 through the coherent interconnect 206 as discussed with reference to FIG. 2. For example, the coherent interconnect 206 may be coupled to each of the software streaming components 106 and each of the streaming buffers 104. In some embodiments, the coherent interconnect 206 may also be coupled to one or more memory controllers (not shown) that may be configured to control accesses to system memory by the processor 704.

The packet processing module 710 may be configured to perform one or more packet processing operations on each streaming packet. For example, the one or more packet processing operations may be performed by one or more processor cores for each software streaming component. The one or more packet processing operations may include operations related to data processing (e.g., compression, de-compression, encryption, decryption, etc.), storage processing, network processing, classifications, firewalls, computing, virtualization, offloading (e.g., network or checksum offloads) or any protocol specific processing.

Figure 7B:
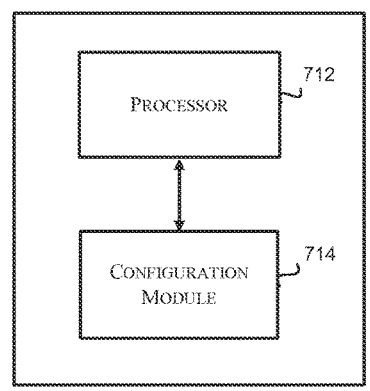
FIG. 7B illustrates an exemplary block diagram of a configuration module, according to one embodiment of the disclosed technology.

FIG. 7B illustrates an exemplary block diagram of a configuration module, in accordance with one embodiment of the technology. The configuration module may allow configuration of one or more packet processing pipelines for processing the packets.

A configuration module 714 may be coupled to a processor 714. For example, the processor 714 may include one or more processors 1-K as discussed with reference to FIGS. 1-4. In some embodiments, one or more processors 1-K may be dedicated for configuration of the pipelines. The configuration module 714 may be implemented in hardware, software or firmware. For example, the configuration module 714 may be implemented as boot ROM, flash memory, jumper wires, pins, or any suitable implementation. In some embodiments, the configuration module 714 may be coupled to an external entity for configuring multiple packet processing pipelines.

The configuration module 714 may be configured for configuring one or more packet processing pipelines to process the incoming packets. For example, the configuration module 714 may configure packet information header for each incoming packet that can define the packet processing pipeline paths through the streaming interconnect 102. Referring back to FIGS. 6B and 6C, a packet information header may be attached to each packet by the ingress processing unit 202. The path field in each packet information header can specify destination routing options for each streaming component. In some embodiments, the packet processing pipeline paths may be defined based on different protocols and functionalities supported by different devices. In some embodiments, the packet processing pipeline paths may be predefined at boot time (e.g., as part of BIOS or boot software) for certain types of streaming packets. In some embodiments, the packet processing pipeline paths may be predefined by external entities. For example, a first packet processing pipeline path may be defined to include only software streaming components for a first packet type and a second packet processing pipeline path may be defined to include only hardware streaming components for a second packet type. In some embodiments, the configuration module 714 may configure one or more packet processing pipelines dynamically under certain conditions. For example, the one or more packet processing pipelines can be configured dynamically for live updates, bug fixes, protocol versions, replacement of hardware streaming components with software streaming components, etc.

In some embodiments, the configuration module 714 may also configure the destination table for each software and hardware streaming component that can define the routing options for the next stage in the pipeline. For example, referring back to FIG. 6E, the configuration module 714 can define the destination table 610 for each software streaming component 106 and each hardware streaming component 108 for the device 100.

In some embodiments, the configuration module 714 may also be configured to assign a plurality of streaming buffers to provide an interface between the software streaming components 104 and the streaming interconnect 102. For example, the configuration module 714 may assign the streaming buffers based on different quality of service provided by each streaming buffer, priority level serviced by each streaming buffer, type of traffic handled by each streaming buffer or any other suitable criteria.

Figure 8:
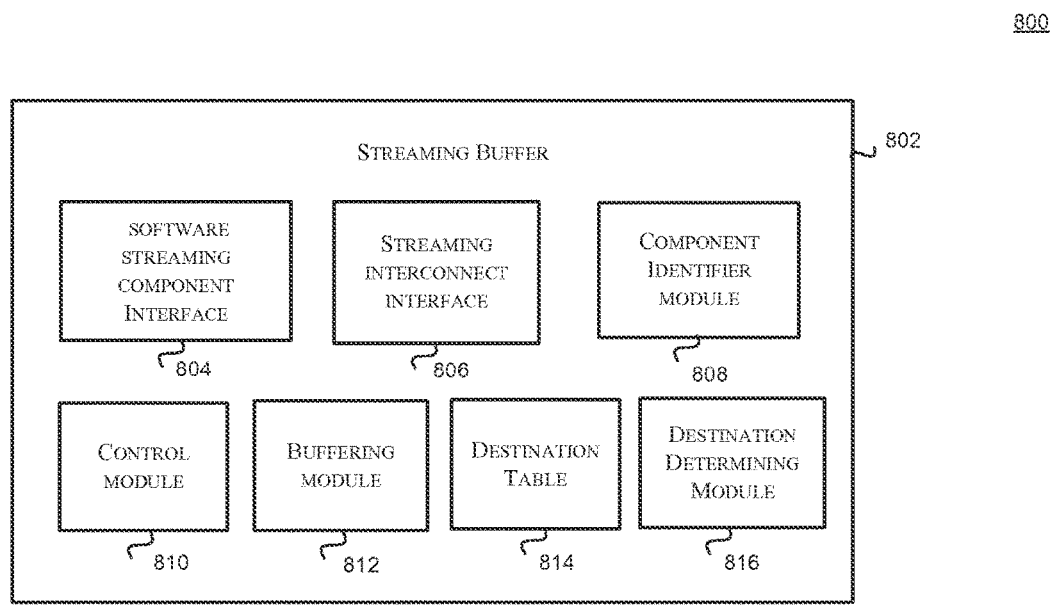
FIG. 8 illustrates an exemplary block diagram of a streaming buffer, according to one embodiment of the disclosed technology.

FIG. 8 illustrates a block diagram of a streaming buffer in accordance with one embodiment of the technology.

FIG. 8 illustrates an exemplary block diagram of a streaming buffer 802 that may be part of the streaming buffers 104 as discussed with reference to FIG. 1. The streaming buffer 802 may include a software streaming component interface 804, a streaming interconnect interface 806, a component identifier module 808, a control module 810, a buffering module 812, a destination table 814 and a destination determining module 816. The streaming buffer 802 may be configured for the direction of writing to or reading from a software streaming component. For example, referring back to FIG. 1, the streaming buffer 802 may be configured to be part of the buffers 104A (for writing into the software streaming component 1 106A) or to be part of the buffers 104B (for reading from the software streaming component 1 106A). In some embodiments, the streaming buffer 802 may be implemented as a FIFO (e.g., linear or circular).

The software streaming component interface 804 may include an interface to the software streaming components, e.g., the software streaming components 106. For example, the software streaming component interface 804 may allow one or more processors 1-K in each software streaming component to access the streaming buffer 802 for read and write operations. In some embodiments, the software streaming component interface 804 may be coupled to the software streaming components 106 via the coherent interconnect 206 as discussed with reference to FIG. 2.

The streaming interconnect interface 806 may include an interface to the streaming interconnect 102. The streaming interconnect interface 806 may be configured to provide an interface between one or more processors 1-K and the streaming interconnect 102 (e.g., via the software streaming component interface 804) for each software streaming component. According to some embodiments of the disclosed technologies, the streaming interconnect interface 806 may be based on a unified interface that may be similar for each hardware streaming component to enable the streaming interconnect 102 to be agnostic to the type of streaming component coupled to the streaming interconnect 102.

The component identifier module 808 may include a component identifier. The component identifier 808 may be used by the streaming interconnect 102 for routing streaming packets to the streaming buffer 802. In some embodiments, the component identifier 808 may identify the software streaming component coupled to the streaming buffer 802.

The control module 810 may include controls for read and write accesses to the streaming buffer 802. For example, the one or more processors 1-K may perform reads and writes to the streaming buffer 802 for performing packet processing operations by the software streaming component coupled to the streaming buffer 802.

The buffering module 812 may include buffer memory or storage for buffering the streaming packets and other relevant information. In some embodiments, the buffering module 812 may be implemented as on-chip memory (e.g., SRAMs). In some embodiments, the buffer module 812 may be implemented as off-chip memory (e.g., Double Data Rate (DDR) SDRAM, SRAM, etc.). For example, in some embodiments, the buffer module 812 may be accessed via memory controllers (not shown) that may be coupled to the coherent interconnect 206. Thus, some embodiments of the disclosed technology may provide a faster low latency path by routing the packets through the coherent interconnect 206 for packet processing by the software streaming components only.

The destination table 814 may include various destination routing options for the streaming buffer 802. For example, the destination table 814 may be similar to the destination table 610 as discussed with reference to FIG. 6E. In some embodiments, the destination table 814 may be setup by the configuration module 714 at boot time to setup destinations for the packet processing pipelines through the streaming interconnect 102 and may allow each streaming component in the packet processing pipeline to dynamically reconfigure the path of the pipeline, e.g., by updating their respective destination tables.

The destination determining module 816 may be configured to determine the next destination for the packet processing pipeline. For example, the destination determining module 816 may determine the next destination based on the destination table 814 and the path field in the packet information header of the streaming packet. In some embodiments, the destination determining module 816 may allow altering the path of the pipeline by changing the path field in the streaming packet.

Figure 9:
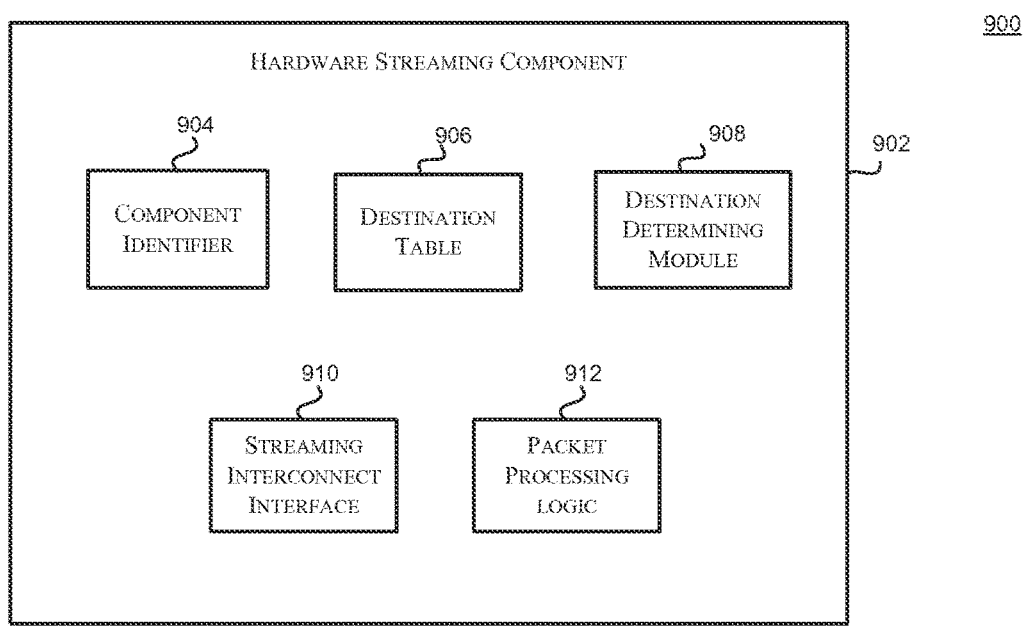
FIG. 9 illustrates an exemplary block diagram of a hardware streaming component, according to one embodiment of the disclosed technology.

FIG. 9 illustrates an exemplary block diagram of a hardware streaming component 902 in accordance with one embodiment of the technology.

The hardware streaming component 902 may be part of the hardware streaming components 108 as discussed with reference to FIG. 1. The hardware streaming component 902 may include a component identifier 904, a destination table 906, a destination determining module 908, a streaming interconnect interface 910 and packet processing logic 912. The hardware streaming component 902 may be implemented as part of an ASIC, FPGA, ASSP, SoC or any general purpose chip. In some embodiments, the hardware streaming component 902 may be implemented as a combination of configurable logic and hardwired logic. For example, configurable logic may include logic that can be configured or reconfigured and the hardwired logic may include burned logic that cannot be reconfigured. In some embodiments, the hardwired logic can provide faster performance as compared to software or configurable logic alternative.

In some embodiments, the component identifier 904 may identify the hardware streaming component coupled to the streaming interconnect 102. For example, the component identifier 904 may be used by the streaming interconnect 102 for routing streaming packets to the hardware streaming component 902.

The destination table 906 may include various destination routing options for the hardware streaming component 902. For example, the destination table 906 may be similar to the destination table 610 as discussed with reference to FIG. 6E. The destination table 906 may be setup by the configuration module 714 to setup destinations for the packet processing pipeline through the streaming interconnect 102.

The destination determining module 908 may be configured to determine the next destination for the packet processing pipeline. For example, the destination determining module 908 may determine the next destination based on the destination table 906 and the path field in the packet information header of the streaming packet. In some embodiments, the destination determining module 908 may alter the path by changing the path field in the streaming packet.

The streaming interconnect interface 910 may be configured to provide an interface between the hardware streaming component 902 and the streaming interconnect 102. According to some embodiments of the disclosed technologies, the streaming interconnect interface 910 may be based on a unified interface that may be similar to the interface between the streaming buffer and the streaming interconnect 102 to enable the streaming interconnect 102 to be agnostic to the type of streaming component coupled to the streaming interconnect 102.

The packet processing logic 912 may be configured to perform one or more packet processing operations on each streaming packet. For example, the one or more packet processing operations may include operations related to data processing (e.g., compression, encryption, decryption, etc.), storage processing, network processing, classifications, firewalls, computing, virtualization, offloading (e.g., network or checksum offloads) or any protocol specific processing.

Figure 10:
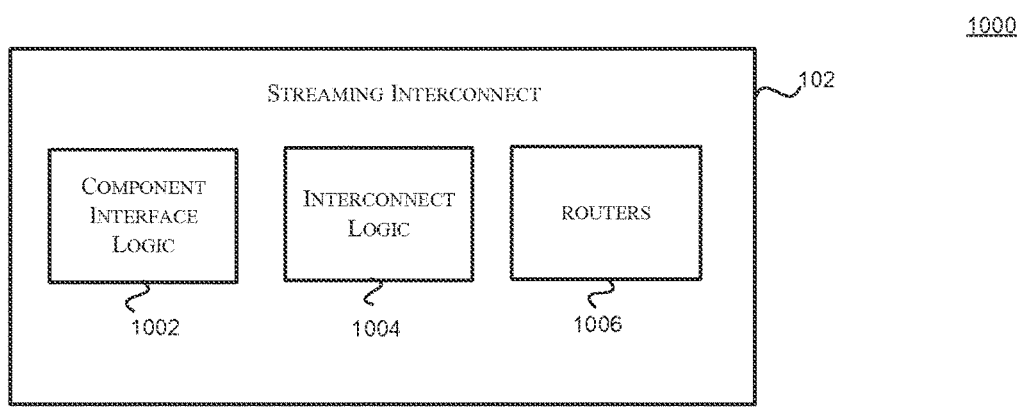
FIG. 10 illustrates a block diagram of a streaming interconnect in accordance with one embodiment of the technology.

FIG. 10 illustrates a block diagram of a streaming interconnect in accordance with one embodiment of the technology.

FIG. 10 illustrates an exemplary block diagram of the streaming interconnect 102 that may include a component interface logic 1002, interconnect logic 1004 and routers 1006.

The component interface logic 1002 may include interface logic to interface with various streaming components, e.g., software streaming components 106 and hardware streaming components 108. According to various embodiments of the disclosed technologies, the component interface logic 1002 may be configured to interface with a software streaming component from the software streaming components 106 or a hardware streaming component from the hardware streaming components 108 using a unified interface. Having a unified interface may allow swapping a streaming component (hardware or software) with another streaming component (hardware or software) without any changes to the streaming interconnect 102.

The interconnect logic 1004 may provide connectivity among the streaming components along the path of each packet processing pipeline through the streaming interconnect 102. The interconnect logic 1004 may be implemented as busses, mesh, matrix, ring or a combination thereof.

The routers 1006 may include one or more routers for routing one or more streaming packets among different streaming components through the interconnect logic 1004. In some embodiments, each of the routers 1006 may use the information in the packet information header to route the streaming packets through the streaming interconnect 102. For example, the address of the next streaming component may be determined from the destination table of the previous streaming component based on the packet information header. In some embodiments, the interconnect logic 1004 and the routers 1006 may be integrated.

Figure 11:
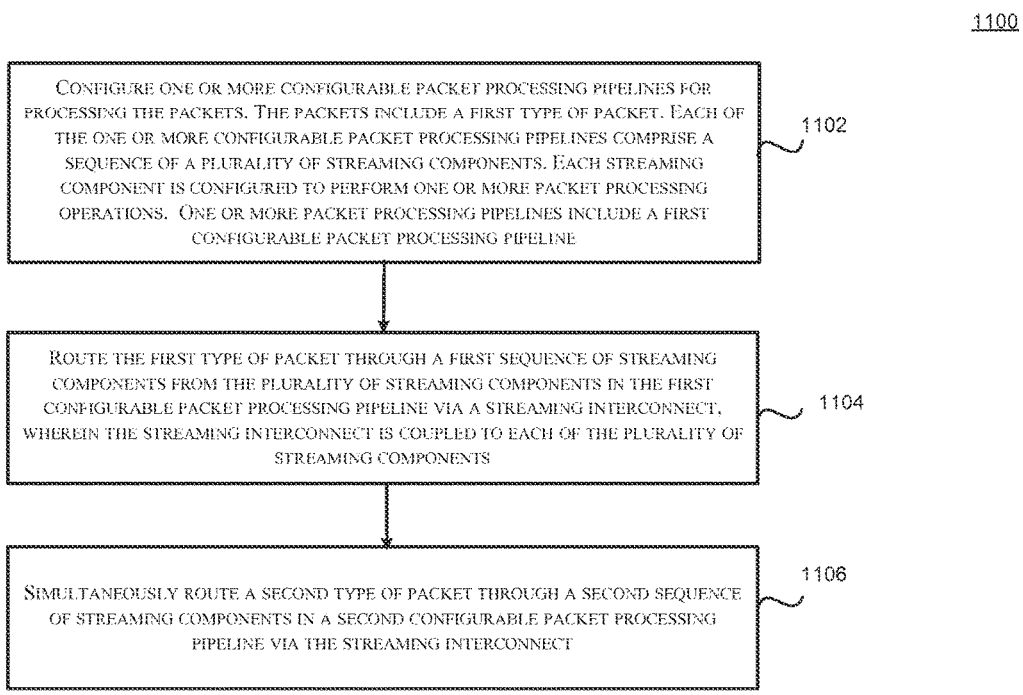
FIG. 11 illustrates a method for configuring one or more packet processing pipelines in accordance with one embodiment of the technology.

FIG. 11 illustrates a method for configuring one or more packet processing pipelines in accordance with one embodiment of the technology.

In step 1102, one or more configurable packet processing pipelines can be configured for processing the packets. The one or more configurable packet processing pipelines may include a first configurable packet processing pipeline and a second configurable packet processing pipeline. Each of the one or more packet processing pipelines can comprise a sequence of a plurality of streaming components. Each streaming component can be configured to perform one or more packet processing operations, e.g., encryption, decryption, compression, de-compression, etc. As discussed with reference to FIG. 2, each packet may include an original packet header and a payload. In some embodiments of the invention, a packet may be split into two or more streaming packets, e.g., a first streaming packet and a second streaming packet. The first streaming packet may include a first packet information header attached to the original packet header and the second streaming packet may include a second packet information header attached to the payload. The first packet processing pipeline 212 can be configured for processing the first streaming packet and the second packet processing pipeline 214 can be configured for processing the second streaming packet. The first streaming packet can include a first type of streaming packet (e.g., comprising the original packet header) and the second streaming packet may include a second type of streaming packet (e.g., comprising the payload). As discussed with reference to FIG. 7B, the first packet processing pipeline 212 and the second packet processing pipeline 214 can be configured by the configuration module 714, e.g., at the boot time or dynamically. In some embodiments, the first configurable packet processing pipeline can be dynamically reconfigured to alter the first sequence of streaming components. For example, as discussed with the reference to FIGS. 5A-5D, the first packet processing pipeline 212 can be reconfigured to alter the first sequence by inserting another streaming component or swapping a streaming component with another streaming component. According to various embodiments of the disclosed technologies, the first sequence of streaming components in the first packet processing pipeline 212 can be altered without changing the streaming interconnect 102 interface.

In step 1104, the first type of streaming packet can be routed through a first sequence of streaming components in the first configurable packet processing pipeline via a streaming interconnect, wherein the streaming interconnect is coupled to each of the plurality of streaming components. As discussed with reference to FIG. 2, the first type of streaming packet can be routed using the packet information header included in the streaming packet. For example, the first streaming packet may be routed through a first sequence of streaming components in the first packet processing pipeline 212 using the component identifier of each streaming component in the first sequence. As illustrated in FIG. 2, the first sequence of streaming components in the first packet processing pipeline 212 may include the software streaming component 2 106B, hardware streaming component 2 108B and the software streaming component M 106D.

In step 1106, the second type of streaming packet can be routed simultaneously through a second sequence of streaming components in a second configurable packet processing pipeline via the streaming interconnect 102. For example, the second streaming packet may be routed through the second sequence of streaming components in the second packet processing pipeline 214 using the component identifier of each streaming component in the second sequence. As illustrated in FIG. 2, the second sequence of streaming components in the second packet processing pipeline 404 may include the hardware streaming component 1 108A, hardware streaming component 2 108B, hardware streaming component 3 108C, software streaming component M−1 106C and the hardware streaming component N 108D.

In some embodiments, the device 100 may be an I/O adapter device that may be configured to communicate with a host device. For example, in some instances, the I/O adapter device may be configured to process packets associated with the I/O requests for the host device. An exemplary system including an I/O adapter device in communication with a host device is described with reference to FIG. 12.

Figure 12:
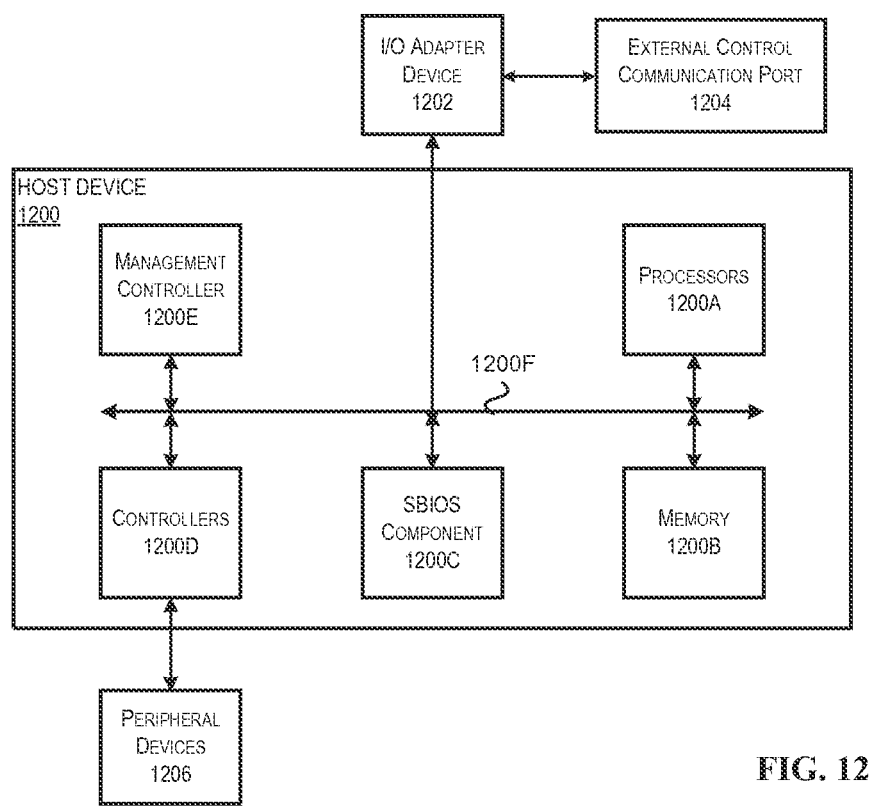
FIG. 12 illustrates a system including an I/O adapter device for processing streaming packets in accordance with one embodiment of the technology.

FIG. 12 illustrates a high level system diagram for an I/O device in communication with a host device in accordance with some embodiments of the disclosed technologies.

As illustrated in the figure, a host device 1200 may be communicatively coupled to an I/O adapter device 1202. For example, the I/O adapter device 1202 may be similar to the device 100, device 200, device 300 or the device 400 as described previously with reference to FIGS. 1-4. In some embodiments, the I/O adapter device 1202 can be attached externally to the host device 1200. In some embodiments, the I/O adapter device 1202 can be internally integrated into the host device 1200. In an illustrative embodiment, the host device 1200 may be associated with various hardware components, software components and respective configurations that facilitate the execution of I/O requests that can result in sending the packets to the I/O adapter device 1202. In one embodiment, the host device 1200 can include a management controller 1200E for managing the operation of host device 1200. For example, in some instances, the management controller 1200E may include an embedded microcontroller that can manage the interface between system management software and the host device 1200 components.

Also in communication with the I/O adapter device 102 may be an external communication port component 1204 for establishing communication channels between the host device 1200 and one or more network based services or other computing devices. Illustratively, the external communication port component 1204 can correspond to a network switch, sometimes known as a Top of Rack ("TOR") switch. The I/O adapter device 1202 can utilize the external communication port component 1204 to maintain communication channels between one or more services and the host device 1200, such as health check services, financial services, and the like.

The I/O adapter device 1202 can also be in communication with a System Basic Input/Output System (SBIOS) component 1200C. The SBIOS component 1200C can include non-transitory executable code, often referred to as firmware, which can be executed by one or more processors and used to cause components of the host device 1200 to initialize and identify system devices such as the video display card, keyboard and mouse, hard disk drive, optical disc drive and other hardware. The SBIOS component 1200C can also include or locate boot loader software that can be utilized to boot the host device 1200.

The SBIOS component 1200C can be connected to (or in communication with) a number of additional computing device resources components, such as processors 1200A, memory 1200B (e.g., RAM), and the like. In one embodiment, such computing device resource components may be physical computing device resources in communication with other components via the communication channel 1200F. The communication channel 1200F can correspond to one or more communication buses, such as a shared bus (e.g, a front side bus, a memory bus), a point-to-point bus such as a PCI or PCI Express bus, etc.

Also in communication with the I/O adapter device 102 via the communication channel 1200F may be one or more controller components 1200D for managing hard drives or other forms of memory. An example of a controller component 1200D can be a SATA hard drive controller that can communicate with one or more peripheral devices 1206, such as hard disks or other storage devices.

In some embodiments, the I/O adapter device 1202 may be configured to perform network processing for the host device 1200. For example, the host device 1200 may communicate with a network (e.g., Ethernet, Wi-Fi, etc.) via the I/O adapter device 1202 and the external control communication port 1204. In some instances, the host device 1200 may send packets to the I/O adapter device 1202 via the communication channel 1200F for network processing. As discussed previously with reference to FIGS. 1-4, the I/O adapter device 1202 may include the streaming interconnect 102 and a plurality of streaming components, e.g., the hardware streaming components 108 and the software streaming components 106 comprising the processors 1-K. Each of the streaming components may be configured to perform one or more packet processing operations such as compression, de-compression, encryption, decryption, etc. The I/O adapter device 1202 can support multiple packet processing pipelines for processing the packets received from the host device 1200 (e.g., via the ingress processing unit 202). The streaming interconnect 102 may provide connectivity among the plurality of streaming components and may allow routing the packets through one or more configurable packet processing pipelines simultaneously by the streaming components. Further, some embodiments of the technology may allow reconfiguring the pipelines dynamically based on the packet type, protocol versions, software updates, bug fixes, etc. without affecting the operation of the I/O adapter device 1202. Processed packets (e.g., provided by the egress processing unit 204) can be sent to the network via the external control communication port 1204.

Various embodiments of the disclosed technologies can provide a flexible streaming infrastructure by allowing dynamic stitching of hardware and software streaming components to form multiple packet processing pipelines that can coexist simultaneously in a streaming interconnect. Embodiments of the technology can allow the software to not only define potential streaming performance but also build the pipelines from a bag of parts, i.e., a set of hardware and software streaming components that can be mixed, matched, and configured to be optimized for different use cases.

Figure 13:
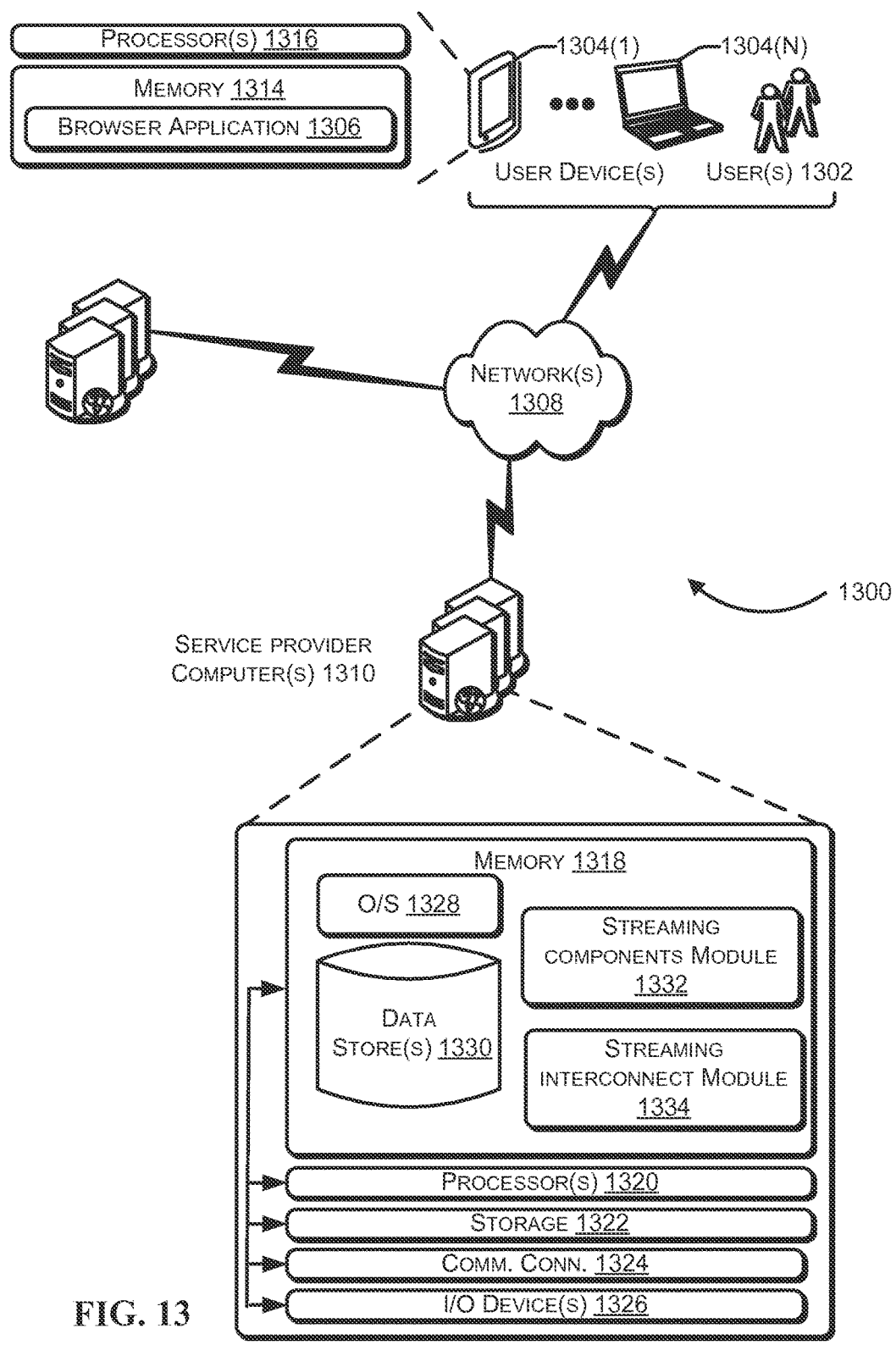
FIG. 13 illustrates an exemplary architecture for features and systems described herein that includes one or more service provider computers and/or a user device connected via one or more networks, according to at least one exemplary embodiment.

FIG. 13 illustrates an exemplary architecture for features and systems described herein that includes one or more service provider computers and/or a user device connected via one or more networks, according to at least one exemplary embodiment. The devices discussed in FIGS. 1-12, may use one or more components of the computing devices described in FIG. 13 or may represent one or more computing devices described in FIG. 13. In architecture 1300, one or more users 1302 may utilize user computing devices 1304(1)-(N) (collectively, user devices 1304) to access application 1306 (e.g., a web browser or mobile device application), via one or more networks 1308. In some aspects, application 1306 may be hosted, managed and/or provided by a computing resources service or service provider. One or more service provider computers 1310 may provide a native application which is configured to run on user devices 1304 which user(s) 1302 may interact with. Service provider computer(s) 1310 may, in some examples, provide computing resources such as, but not limited to, client entities, low latency data storage, durable data storage, data access, management, virtualization, cloud-based software solutions, electronic content performance management, etc. Service provider computer(s) 1310 may also be operable to provide web hosting, computer application development and/or implementation platforms, combinations of the foregoing or the like to user(s) 1302. Service provider computer(s) 1310, in some examples, may communicate with one or more third party computers 1312.

In some examples, network(s) 1308 may include any one or a combination of many different types of networks, such as cable networks, the Internet, wireless networks, cellular networks and other private and/or public networks. While the illustrated example represents user(s) 1302 accessing application 1306 over network(s) 1308, the described techniques may equally apply in instances where user(s) 1302 interact with service provider computer(s) 1310 via user device(s) 1304 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1306 may allow user(s) 1302 to interact with service provider computer(s) 1310 such as to access web content (e.g., web pages, music, video, etc.). Service provider computer(s) 1310, perhaps arranged in a cluster of servers or as a server farm, may host application 1306 and/or cloud-based software services. Other server architectures may also be used to host application 1306. Application 1306 may be capable of handling requests from many users 1302 and serving, in response, various item web pages. Application 1306 can provide any type of website that supports user interaction, including social networking sites, online retailers, informational sites, blog sites, search engine sites, news and entertainment sites and so forth. As discussed above, the described techniques can similarly be implemented outside of application 1306, such as with other applications running on user device(s) 1404.

User device(s) 1304 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1304 may be in communication with service provider computer(s) 1310 via network(s) 1308, or via other network connections. Additionally, user device(s) 1304 may be part of the distributed system managed by, controlled by or otherwise part of service provider computer(s) 1310 (e.g., a console device integrated with service provider computers 1310).

In one illustrative configuration, user device(s) 1304 may include at least one memory 1314 and one or more processing units (or processor(s)) 1316. Processor(s) 1316 may be implemented as appropriate in hardware, computer-executable instructions, firmware, or combinations thereof. Computer-executable instruction or firmware implementations of processor(s) 1316 may include computer-executable or machine-executable instructions written in any suitable programming language to perform the various functions described. User device(s) 1304 may also include geo-location devices (e.g., a global positioning system (GPS) device or the like) for providing and/or recording geographic location information associated with user device(s) 1304.

Memory 1314 may store program instructions that are loadable and executable on processor(s) 1316, as well as data generated during the execution of these programs. Depending on the configuration and type of user device(s) 1304, memory 1314 may be volatile (such as random access memory (RAM)) and/or non-volatile (such as read-only memory (ROM), flash memory, etc.). User device(s) 1304 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1314 may include multiple different types of memory, such as static random access memory (SRAM), dynamic random access memory (DRAM), or ROM.

Turning to the contents of memory 1314 in more detail, memory 1314 may include an operating system and one or more application programs or services for implementing the features disclosed herein including at least a user provided input element or electronic service web page, such as via browser application 1306 or dedicated applications (e.g., smart phone applications, tablet applications, etc.). Browser application 1306 may be configured to receive, store and/or display a website or other interface for interacting with service provider computer(s) 1310. Additionally, memory 1314 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1304.

In some aspects, service provider computer(s) 1310 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1310 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1310 may be in communication with user device(s) 1304 and/or other service providers via network(s) 1308, or via other network connections. Service provider computer(s) 1310 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1310 may include at least one memory 1318 and one or more processing units (or processor(s)) 1320. Processor(s) 1320 may be implemented as appropriate in hardware, computer-executable instructions, firmware or combinations thereof. Computer-executable instruction or firmware implementations of processor(s) 1320 may include computer-executable or machine-executable instructions written in any suitable programming language to perform the various functions described.

In some instances, hardware processor(s) 1320 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1318 may store program instructions that are loadable and executable on processor(s) 1320, as well as data generated during the execution of these programs. Depending on the configuration and type of service provider computer(s) 1310, memory 1318 may be volatile (such as RAM) and/or non-volatile (such as ROM, flash memory, etc.). Service provider computer(s) 1310 or servers may also include additional storage 1322, which may include removable storage and/or non-removable storage. The additional storage 1322 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1318 may include multiple different types of memory, such as SRAM, DRAM, or ROM.

Memory 1318, the additional storage 1322, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1318 and the additional storage 1322 are all examples of computer storage media. Additional types of computer storage media that may be present in service provider computer(s) 1310 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1310. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1310 may also contain communications connection(s) 1324 that allow service provider computer(s) 1310 to communicate with a stored database, another computing device or server, user terminals and/or other devices on network(s) 1308. Service provider computer(s) 1310 may also include I/O device(s) 1326, such as a keyboard, a mouse, a pen, a voice input device, a touch input device, a display, speakers, a printer and the like.

Memory 1318 may include an operating system 1328, one or more data stores 1330 and/or one or more application programs or services for implementing the features disclosed herein, including optionally a streaming components module 1332 and a streaming interconnect module 1334. For example, the streaming components module 1332 may include software streaming components 106 and hardware streaming components 108 as described with reference to FIG. 1. The streaming interconnect module 1334 may be similar to the streaming interconnect module 102. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, and/or functions described herein can be provided by one or more modules that exist as separate modules and/or module functions described herein can be spread over multiple modules.

Figure 14:
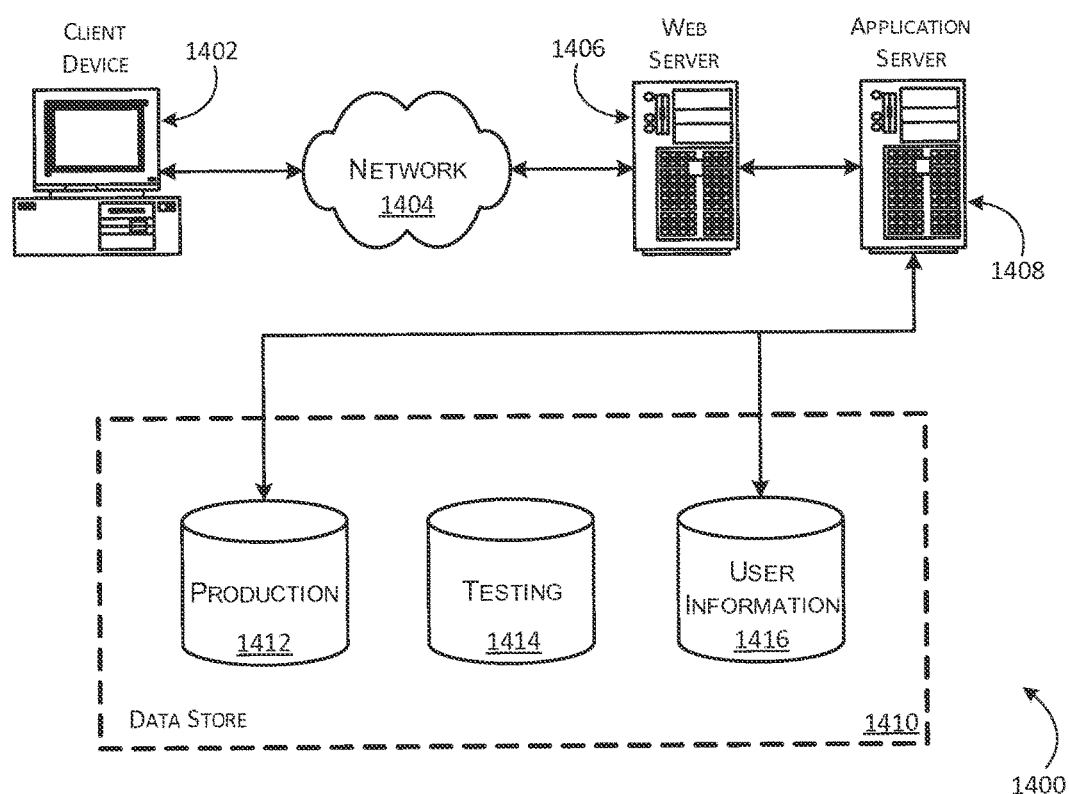
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An input/output device for processing packets, the device comprising:
   one or more software streaming components, wherein each software streaming component is configured to perform one or more packet processing operations for the device, each software streaming component comprising one or more processors, configured to execute instructions for processing the packets;
   a plurality of streaming buffers coupled to the one or more processors;
   a plurality of hardware streaming components configured to perform one or more packet processing operations for the device; and
   a streaming interconnect coupled to the plurality of streaming buffers and to the plurality of hardware streaming components;
   wherein each of the plurality of streaming buffers and each of the plurality of the hardware streaming components is configured to route the packets through the streaming interconnect for one or more configurable packet processing pipelines, wherein the one or more configurable packet processing pipelines include a first packet processing pipeline, wherein the streaming interconnect routes a first type of packet through a first sequence of software streaming components and hardware streaming components of the first packet processing pipeline, and wherein the first sequence is altered by one of the software streaming components or the hardware streaming components in the first packet processing pipeline.

2. The input/output device of claim 1, wherein the one or more configurable packet processing pipelines further includes a second configurable packet processing pipeline, wherein the second configurable packet processing pipeline includes a second sequence of one or more hardware streaming components, one or more software streaming components, or a plurality of hardware and software streaming components for a second type of packet.

3. The input/output device of claim 1, wherein each of the plurality of streaming buffers and the plurality of the hardware streaming components are configured to route the packets based on a respective packet information header attached to each packet.

4. A device for processing packets, the device comprising:
   one or more configurable packet processing pipelines for processing the packets, wherein each of the one or more configurable packet processing pipelines includes a plurality of packet processing components, wherein each packet processing component is configured to perform one or more packet processing operations for the device; and
   a packet processing interconnect coupled to the plurality of packet processing components, wherein each packet processing component is configured to route the packets through the packet processing interconnect for the one or more configurable packet processing pipelines;
   wherein the one or more configurable packet processing pipelines include a first packet processing pipeline, wherein the packet processing interconnect routes a first type of packet through a first sequence of packet processing components in the first packet processing pipeline, and wherein the first sequence of packet processing components is altered by one of the packet processing components in the first packet processing pipeline.

5. The device of claim 4, wherein the plurality of packet processing components include one or more software packet processing components, each software packet processing component comprising:
   one or more processors configured to execute instructions for processing the packets.

6. The device of claim 5, the device further comprising a plurality of packet processing buffers, wherein one or more packet processing buffers from the plurality of packet processing buffers are coupled to each of the one or more processors and to the packet processing interconnect, and wherein the one or more processors perform writes and reads to the one or more packet processing buffers.

7. The device of claim 4, wherein the plurality of packet processing components include one or more hardware packet processing components coupled to the packet processing interconnect.

8. The device of claim 4, wherein the packet processing interconnect is coupled to each of the plurality of packet processing components using a unified interface.

9. The device of claim 4, further comprising an ingress processing unit coupled to the packet processing interconnect, wherein the ingress processing unit is configured to receive the packets and to attach a respective packet information header to each of the received packets.

10. The device of claim 9, further comprising an egress processing unit coupled to the packet processing interconnect, wherein the egress processing unit is configured to detach the respective packet information header from each of the packets.

11. The device of claim 9, wherein the packet processing components route the packets through the packet processing interconnect based on the respective packet information header attached to each of the packets.

12. The device of claim 4, wherein each packet processing component from the plurality of packet processing components includes a destination table that is configured to include routing options for routing the packets.

13. The device of claim 4, wherein the one or more configurable packet processing pipelines further includes a second packet processing pipeline, wherein the packet processing interconnect simultaneously routes the first type of packet through the first sequence of packet processing components in the first packet processing pipeline and a second type of packet through a second sequence of packet processing components in the second packet processing pipeline.

14. A method for processing packets, the method comprising:
  configuring a first packet processing pipeline of an input/output device, the packets including a first type of packet, the first packet processing pipeline comprising a first sequence of streaming components, wherein each streaming component is configured to perform a respective packet processing operation, and wherein the first sequence of streaming components is altered by one of the streaming components in the first packet processing pipeline; and
  routing the first type of packet through a portion of the first packet processing pipeline via a streaming interconnect, wherein the streaming interconnect is coupled to each of the streaming components.

15. The method of claim 14 wherein the packets include a second type of packet, the method further comprising: simultaneous with the routing of the first type of packet, routing the second type of packet through a portion of a second packet processing pipeline of the input/output device via the streaming interconnect, the second packet processing pipeline comprising a second sequence of streaming components.

16. The method of claim 15, wherein each packet comprises an original packet header and a payload, and wherein the first type of packet is a first streaming packet comprising a first packet information header attached to the original packet header and the second type of packet is a second streaming packet comprising a second packet information header attached to the payload.

17. The method of claim 16, wherein routing the first type of packet through the portion of the first packet processing pipeline is performed using the first packet information header and routing the second type of packet through the portion of the second packet processing pipeline is performed using the second packet information header.

* * * * *

UNITED STATES PATENT AND TRADEMARK OFFICE
CERTIFICATE OF CORRECTION

PATENT NO. : 9,940,284 B1  
APPLICATION NO. : 14/673474  
DATED : April 10, 2018  
INVENTOR(S) : Mark Bradley Davis et al.

It is certified that error appears in the above-identified patent and that said Letters Patent is hereby corrected as shown below:

On the Title Page

Item (57), Delete: "A device can include one of more configurable packet processing pipelines to process a plurality of packets."

Insert: --A device can include one or more configurable packet processing pipelines to process a plurality of packets.--

Signed and Sealed this
Twenty-fourth Day of July, 2018

Andrei Iancu
*Director of the United States Patent and Trademark Office*